(12) United States Patent
Mertz et al.

(10) Patent No.: US 9,157,987 B2
(45) Date of Patent: Oct. 13, 2015

(54) ABSOLUTE DISTANCE METER BASED ON AN UNDERSAMPLING METHOD

(75) Inventors: Jacob J. Mertz, Glen Mills, PA (US); Robert E. Bridges, Kennett Square, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 168 days.

(21) Appl. No.: 13/442,165

(22) Filed: Apr. 9, 2012

(65) Prior Publication Data

US 2012/0262697 A1    Oct. 18, 2012

Related U.S. Application Data

(60) Provisional application No. 61/592,049, filed on Jan. 30, 2012, provisional application No. 61/475,703, filed on Apr. 15, 2011.

(51) Int. Cl.
*G01C 3/08* (2006.01)
*G01S 7/481* (2006.01)
(Continued)

(52) U.S. Cl.
CPC ............. *G01S 7/4818* (2013.01); *G01C 3/08* (2013.01); *G01C 15/002* (2013.01); *G01S 7/4808* (2013.01); *G01S 7/4813* (2013.01);
(Continued)

(58) Field of Classification Search
CPC ........ G01C 3/08; G01C 15/002; G01S 17/89; G01S 7/4817; G01S 17/42
USPC ......... 356/3.01, 4.01, 4.07, 5.01, 5.09, 9, 625
See application file for complete search history.

(56) References Cited

U.S. PATENT DOCUMENTS 2,612,994 A   10/1952   Woodland
2,682,804 A   7/1954   Clifford et al.
(Continued)

FOREIGN PATENT DOCUMENTS

CA   2811444      3/2012
CN   1263807 A    8/2000
(Continued)

OTHER PUBLICATIONS

Gentile, Ken. Super-Nyquist Operation of the AD9912 Yields a High RF Output Signal. 2007. Analog Devices.*
(Continued)

*Primary Examiner* — Isam Alsomiri
*Assistant Examiner* — Samantha K Abraham
(74) *Attorney, Agent, or Firm* — Cantor Colburn LLP

(57) ABSTRACT

A measurement system includes a signal generator producing an RF modulation frequency and sampling frequency and sending the sampling frequency to an ADC, and sending the RF frequency to modulate a first light source to produce a first light; an optical system sending a portion of the first light to a reference optical detector a portion of the first light out a measurement device to a target that returns a second light to the optical system which sends the second light to a measure optical detector, the reference and measure optical detectors converting the optical signals into corresponding electrical signals; a first ADC channel receiving the electrical measure signal and producing digital measure values; a second ADC channel receiving the electrical reference signal and producing digital reference values; and a processor receiving the digital measure and reference values and calculating the device to target distance.

17 Claims, 16 Drawing Sheets

(51) Int. Cl.
*G01C 15/00* (2006.01)
*G01S 7/48* (2006.01)
*G01S 7/491* (2006.01)
*G01S 17/42* (2006.01)
*G01S 17/66* (2006.01)
*G01S 17/89* (2006.01)

(52) U.S. Cl.
CPC ............... *G01S 7/491* (2013.01); *G01S 17/42* (2013.01); *G01S 17/66* (2013.01); *G01S 17/89* (2013.01)

(56) References Cited

U.S. PATENT DOCUMENTS

| | | | |
|---|---|---|---|
| 2,784,641 | A | 3/1957 | Keuffel et al. |
| 3,339,457 | A | 9/1967 | Pun |
| 3,365,717 | A | 1/1968 | Holscher |
| 3,464,770 | A | 9/1969 | Schmidt |
| 3,497,695 | A | 2/1970 | Smith et al. |
| 3,508,828 | A | 4/1970 | Froome et al. |
| 3,619,058 | A | 11/1971 | Hewlett et al. |
| 3,627,429 | A | 12/1971 | Jaenicke et al. |
| 3,658,426 | A | 4/1972 | Vyce |
| 3,728,025 | A | 4/1973 | Madigan et al. |
| 3,740,141 | A | 6/1973 | DeWitt, Jr. |
| 3,779,645 | A | 12/1973 | Nakazawa et al. |
| 3,813,165 | A | 5/1974 | Hines et al. |
| 3,832,056 | A | 8/1974 | Shipp et al. |
| 3,900,260 | A | 8/1975 | Wendt |
| 3,914,052 | A | 10/1975 | Wiklund |
| 4,113,381 | A | 9/1978 | Epstein |
| 4,178,515 | A | 12/1979 | Tarasevich |
| 4,297,030 | A | 10/1981 | Chaborski |
| 4,403,857 | A | 9/1983 | Holscher |
| 4,453,825 | A | 6/1984 | Buck et al. |
| 4,498,764 | A | 2/1985 | Bolkow et al. |
| 4,521,107 | A | 6/1985 | Chaborski et al. |
| 4,531,833 | A | 7/1985 | Ohtomo |
| 4,537,475 | A | 8/1985 | Summers et al. |
| 4,632,547 | A | 12/1986 | Kaplan et al. |
| 4,652,130 | A | 3/1987 | Tank |
| 4,689,489 | A | 8/1987 | Cole |
| 4,692,023 | A | 9/1987 | Ohtomo et al. |
| 4,699,508 | A | 10/1987 | Bolkow et al. |
| 4,707,129 | A | 11/1987 | Hashimoto et al. |
| 4,714,339 | A | 12/1987 | Lau et al. |
| 4,731,812 | A | 3/1988 | Akerberg |
| 4,767,257 | A | 8/1988 | Kato |
| 4,790,651 | A | 12/1988 | Brown et al. |
| 4,839,507 | A | 6/1989 | May |
| 5,002,388 | A | 3/1991 | Ohishi et al. |
| 5,051,934 | A | 9/1991 | Wiklund |
| 5,069,524 | A | 12/1991 | Watanabe et al. |
| 5,082,364 | A | 1/1992 | Russell |
| 5,090,131 | A | 2/1992 | Deer |
| 5,162,862 | A | 11/1992 | Bartram et al. |
| 5,198,868 | A | 3/1993 | Saito et al. |
| 5,237,384 | A | 8/1993 | Fukunaga et al. |
| 5,263,103 | A | 11/1993 | Kosinski |
| 5,301,005 | A | 4/1994 | deVos et al. |
| 5,319,434 | A | 6/1994 | Croteau et al. |
| 5,392,521 | A | 2/1995 | Allen |
| 5,400,130 | A | 3/1995 | Tsujimoto et al. |
| 5,402,193 | A | 3/1995 | Choate |
| 5,416,321 | A | 5/1995 | Sebastian et al. |
| 5,440,112 | A | 8/1995 | Sakimura et al. |
| 5,448,505 | A | 9/1995 | Novak |
| 5,455,670 | A | 10/1995 | Payne et al. |
| 5,500,737 | A | 3/1996 | Donaldson et al. |
| 5,534,992 | A | 7/1996 | Takeshima et al. |
| D378,751 | S | 4/1997 | Smith |
| 5,737,068 | A | 4/1998 | Kaneko et al. |
| 5,742,379 | A | 4/1998 | Reifer |
| 5,754,284 | A | 5/1998 | Leblanc et al. |
| RE35,816 | E | 6/1998 | Schulz |
| 5,764,360 | A | 6/1998 | Meier |
| 5,771,623 | A | 6/1998 | Pernstich et al. |
| 5,861,956 | A | 1/1999 | Bridges et al. |
| 5,880,822 | A | 3/1999 | Kubo |
| 5,886,775 | A | 3/1999 | Houser et al. |
| 5,886,777 | A | 3/1999 | Hirunuma |
| 5,892,575 | A | 4/1999 | Marino |
| 5,893,214 | A | 4/1999 | Meier et al. |
| 5,926,388 | A | 7/1999 | Kimbrough et al. |
| 5,930,030 | A | 7/1999 | Scifres |
| 5,991,011 | A | 11/1999 | Damm |
| 6,017,125 | A | 1/2000 | Vann |
| 6,023,326 | A | 2/2000 | Katayama et al. |
| 6,052,190 | A | 4/2000 | Sekowski et al. |
| D427,087 | S | 6/2000 | Kaneko et al. |
| 6,097,491 | A | 8/2000 | Hartrumpf |
| 6,097,897 | A | 8/2000 | Ide |
| 6,100,540 | A | 8/2000 | Ducharme et al. |
| 6,122,058 | A * | 9/2000 | Van Der Werf et al. ...... 356/635 |
| 6,166,809 | A | 12/2000 | Pettersen |
| 6,324,024 | B1 | 11/2001 | Shirai et al. |
| 6,330,379 | B1 | 12/2001 | Hendriksen |
| 6,351,483 | B1 | 2/2002 | Chen |
| 6,369,880 | B1 | 4/2002 | Steinlechner |
| 6,437,859 | B1 | 8/2002 | Ohtomo et al. |
| 6,462,810 | B1 | 10/2002 | Muraoka et al. |
| 6,463,393 | B1 | 10/2002 | Giger |
| 6,490,027 | B1 | 12/2002 | Rajchel et al. |
| 6,532,060 | B1 | 3/2003 | Kindaichi et al. |
| 6,563,569 | B2 | 5/2003 | Osawa et al. |
| 6,583,862 | B1 | 6/2003 | Perger |
| 6,611,617 | B1 | 8/2003 | Crampton |
| 6,633,367 | B2 | 10/2003 | Gogolla |
| 6,650,222 | B2 | 11/2003 | Darr |
| 6,678,059 | B2 | 1/2004 | Cho et al. |
| 6,727,985 | B2 | 4/2004 | Giger |
| 6,754,370 | B1 | 6/2004 | Hall-Holt et al. |
| 6,765,653 | B2 | 7/2004 | Shirai et al. |
| 6,847,436 | B2 | 1/2005 | Bridges |
| 6,859,744 | B2 | 2/2005 | Giger |
| 6,864,966 | B2 | 3/2005 | Giger |
| 6,996,914 | B1 | 2/2006 | Istre et al. |
| 7,023,531 | B2 | 4/2006 | Gogolla et al. |
| 7,086,169 | B1 | 8/2006 | Bayham et al. |
| 7,095,490 | B2 | 8/2006 | Ohtomo et al. |
| 7,099,000 | B2 | 8/2006 | Connolly |
| 7,177,014 | B2 | 2/2007 | Mori et al. |
| 7,196,776 | B2 | 3/2007 | Ohtomo et al. |
| 7,224,444 | B2 | 5/2007 | Stierle et al. |
| 7,246,030 | B2 | 7/2007 | Raab et al. |
| 7,248,374 | B2 | 7/2007 | Bridges |
| 7,253,891 | B2 | 8/2007 | Toker et al. |
| 7,256,899 | B1 | 8/2007 | Faul et al. |
| 7,262,863 | B2 | 8/2007 | Schmidt et al. |
| 7,285,793 | B2 | 10/2007 | Husted |
| 7,286,246 | B2 | 10/2007 | Yoshida |
| 7,312,862 | B2 | 12/2007 | Zumbrunn |
| 7,325,326 | B1 | 2/2008 | Istre et al. |
| 7,327,446 | B2 | 2/2008 | Cramer et al. |
| 7,336,346 | B2 | 2/2008 | Aoki et al. |
| 7,336,375 | B1 | 2/2008 | Faul et al. |
| 7,339,655 | B2 | 3/2008 | Nakamura et al. |
| 7,352,446 | B2 | 4/2008 | Bridges et al. |
| 7,372,558 | B2 | 5/2008 | Kaufman et al. |
| 7,453,554 | B2 | 11/2008 | Yang et al. |
| 7,466,401 | B2 | 12/2008 | Cramer et al. |
| 7,471,377 | B2 | 12/2008 | Liu et al. |
| 7,474,388 | B2 | 1/2009 | Ohtomo et al. |
| 7,480,037 | B2 | 1/2009 | Palmateer et al. |
| 7,492,444 | B2 | 2/2009 | Osada |
| 7,511,824 | B2 | 3/2009 | Sebastian et al. |
| 7,518,709 | B2 | 4/2009 | Oishi et al. |
| 7,535,555 | B2 | 5/2009 | Nishizawa et al. |
| 7,565,216 | B2 | 7/2009 | Soucy |
| 7,586,586 | B2 | 9/2009 | Constantikes |
| 7,614,019 | B2 | 11/2009 | Rimas Ribikauskas et al. |
| D605,959 | S | 12/2009 | Apotheloz |
| 7,634,374 | B2 | 12/2009 | Chouinard et al. |

(56) References Cited

U.S. PATENT DOCUMENTS

| | | |
|---|---|---|
| 7,692,628 B2 | 4/2010 | Smith et al. |
| 7,701,559 B2 | 4/2010 | Bridges et al. |
| 7,701,566 B2 | 4/2010 | Kumagai et al. |
| 7,710,396 B2 | 5/2010 | Smith et al. |
| 7,724,380 B2 | 5/2010 | Horita et al. |
| 7,738,083 B2 | 6/2010 | Luo et al. |
| 7,751,654 B2 | 7/2010 | Lipson et al. |
| 7,761,814 B2 | 7/2010 | Rimas-Ribikauskas et al. |
| 7,782,298 B2 | 8/2010 | Smith et al. |
| 7,800,758 B1 | 9/2010 | Bridges et al. |
| 7,804,051 B2 | 9/2010 | Hingerling et al. |
| 7,804,602 B2 | 9/2010 | Raab |
| 7,812,736 B2 | 10/2010 | Collingwood et al. |
| 7,812,969 B2 | 10/2010 | Morimoto et al. |
| D629,314 S | 12/2010 | Ogasawara |
| 7,876,457 B2 | 1/2011 | Rueb |
| 7,894,079 B1 | 2/2011 | Altendorf et al. |
| 7,929,150 B1 | 4/2011 | Schweiger |
| 7,976,387 B2 | 7/2011 | Venkatesh et al. |
| 7,983,872 B2 | 7/2011 | Makino et al. |
| 7,990,523 B2 | 8/2011 | Schlierbach et al. |
| 7,990,550 B2 | 8/2011 | Aebischer et al. |
| 8,087,315 B2 | 1/2012 | Goossen et al. |
| 8,094,121 B2 | 1/2012 | Obermeyer et al. |
| 8,094,212 B2 | 1/2012 | Jelinek |
| 8,125,629 B2 | 2/2012 | Dold et al. |
| 8,151,477 B2 | 4/2012 | Tait |
| 8,190,030 B2 | 5/2012 | Leclair et al. |
| 8,217,893 B2 | 7/2012 | Quinn et al. |
| 8,279,430 B2 | 10/2012 | Dold et al. |
| 8,314,939 B2 | 11/2012 | Kato |
| 8,360,240 B2 | 1/2013 | Kallabis |
| 8,387,961 B2 | 3/2013 | Im |
| 8,405,604 B2 | 3/2013 | Pryor et al. |
| 8,422,034 B2 | 4/2013 | Steffensen et al. |
| 8,437,011 B2 | 5/2013 | Steffensen et al. |
| 8,438,747 B2 | 5/2013 | Ferrari |
| 8,467,072 B2 | 6/2013 | Cramer et al. |
| 8,483,512 B2 | 7/2013 | Moeller |
| 8,509,949 B2 | 8/2013 | Bordyn et al. |
| 8,537,375 B2 | 9/2013 | Steffensen et al. |
| 8,654,354 B2 | 2/2014 | Steffensen et al. |
| 8,659,749 B2 | 2/2014 | Bridges |
| 8,670,114 B2 | 3/2014 | Bridges et al. |
| 8,681,317 B2 | 3/2014 | Moser et al. |
| 8,699,756 B2 | 4/2014 | Jensen |
| 8,717,545 B2 | 5/2014 | Sebastian et al. |
| 8,772,719 B2 | 7/2014 | Böckem |
| 8,931,183 B2 | 1/2015 | Jonas |
| 2001/0045534 A1 | 11/2001 | Kimura |
| 2002/0093646 A1 | 7/2002 | Muraoka et al. |
| 2002/0148133 A1 | 10/2002 | Bridges et al. |
| 2002/0179866 A1 | 12/2002 | Hoeller et al. |
| 2003/0020895 A1 | 1/2003 | Bridges |
| 2003/0033041 A1 | 2/2003 | Richey |
| 2003/0048459 A1 | 3/2003 | Gooch |
| 2003/0090682 A1 | 5/2003 | Gooch et al. |
| 2003/0112449 A1 | 6/2003 | Tu et al. |
| 2003/0133092 A1 | 7/2003 | Rogers |
| 2003/0133094 A1* | 7/2003 | Becht .......................... 356/5.01 |
| 2003/0179362 A1 | 9/2003 | Osawa et al. |
| 2004/0041996 A1 | 3/2004 | Abe |
| 2004/0075823 A1 | 4/2004 | Lewis et al. |
| 2004/0170363 A1 | 9/2004 | Angela |
| 2004/0189944 A1 | 9/2004 | Kaufman et al. |
| 2005/0147477 A1 | 7/2005 | Clark |
| 2005/0179890 A1 | 8/2005 | Cramer et al. |
| 2005/0284937 A1 | 12/2005 | Xi et al. |
| 2006/0053647 A1 | 3/2006 | Raab et al. |
| 2006/0066836 A1 | 3/2006 | Bridges et al. |
| 2006/0103853 A1 | 5/2006 | Palmateer |
| 2006/0132803 A1 | 6/2006 | Clair et al. |
| 2006/0140473 A1 | 6/2006 | Brooksby et al. |
| 2006/0141435 A1 | 6/2006 | Chiang |
| 2006/0145703 A1 | 7/2006 | Steinbichler et al. |
| 2006/0146009 A1 | 7/2006 | Syrbe et al. |
| 2006/0161379 A1 | 7/2006 | Ellenby et al. |
| 2006/1045703 | 7/2006 | Steinbichler et al. |
| 2006/0222237 A1 | 10/2006 | Du et al. |
| 2006/0235611 A1 | 10/2006 | Deaton et al. |
| 2006/0279246 A1 | 12/2006 | Hashimoto et al. |
| 2007/0016386 A1 | 1/2007 | Husted |
| 2007/0024842 A1 | 2/2007 | Nishizawa et al. |
| 2007/0090309 A1 | 4/2007 | Hu et al. |
| 2007/0121095 A1 | 5/2007 | Lewis |
| 2007/0127013 A1 | 6/2007 | Hertzman et al. |
| 2007/0130785 A1 | 6/2007 | Bublitz et al. |
| 2007/0247615 A1 | 10/2007 | Bridges |
| 2007/0285672 A1 | 12/2007 | Mukai et al. |
| 2008/0002866 A1 | 1/2008 | Fujiwara |
| 2008/0024795 A1 | 1/2008 | Yamamoto et al. |
| 2008/0043409 A1 | 2/2008 | Kallabis |
| 2008/0107305 A1 | 5/2008 | Vanderkooy et al. |
| 2008/0203299 A1 | 8/2008 | Kozuma et al. |
| 2008/0239281 A1* | 10/2008 | Bridges ........................ 356/5.09 |
| 2008/0246974 A1 | 10/2008 | Wilson et al. |
| 2008/0250659 A1 | 10/2008 | Bellerose et al. |
| 2008/0297808 A1 | 12/2008 | Riza et al. |
| 2008/0302200 A1 | 12/2008 | Tobey |
| 2008/0316497 A1 | 12/2008 | Taketomi et al. |
| 2008/0316503 A1 | 12/2008 | Smarsh et al. |
| 2009/0009747 A1 | 1/2009 | Wolf et al. |
| 2009/0046271 A1 | 2/2009 | Constantikes |
| 2009/0066932 A1 | 3/2009 | Bridges et al. |
| 2009/0109426 A1 | 4/2009 | Cramer et al. |
| 2009/0153817 A1 | 6/2009 | Kawakubo |
| 2009/0157226 A1 | 6/2009 | De Smet |
| 2009/0187373 A1 | 7/2009 | Atwell et al. |
| 2009/0190125 A1 | 7/2009 | Foster et al. |
| 2009/0205088 A1 | 8/2009 | Crampton et al. |
| 2009/0213073 A1 | 8/2009 | Obermeyer et al. |
| 2010/0008543 A1 | 1/2010 | Yamada et al. |
| 2010/0025746 A1 | 2/2010 | Chapman et al. |
| 2010/0058252 A1 | 3/2010 | Ko |
| 2010/0103431 A1 | 4/2010 | Demopoulos |
| 2010/0128259 A1* | 5/2010 | Bridges et al. ................ 356/138 |
| 2010/0142798 A1 | 6/2010 | Weston et al. |
| 2010/0149525 A1 | 6/2010 | Lau |
| 2010/0158361 A1 | 6/2010 | Grafinger et al. |
| 2010/0176270 A1 | 7/2010 | Lau et al. |
| 2010/0207938 A1 | 8/2010 | Yau et al. |
| 2010/0225746 A1 | 9/2010 | Shpunt et al. |
| 2010/0245851 A1 | 9/2010 | Teodorescu |
| 2010/0250175 A1 | 9/2010 | Briggs et al. |
| 2010/0277747 A1 | 11/2010 | Rueb et al. |
| 2011/0003507 A1 | 1/2011 | Van Swearingen et al. |
| 2011/0032509 A1* | 2/2011 | Bridges ........................ 356/5.13 |
| 2011/0043808 A1 | 2/2011 | Isozaki et al. |
| 2011/0069322 A1 | 3/2011 | Hoffer, Jr. |
| 2011/0109502 A1 | 5/2011 | Sullivan |
| 2011/0173827 A1 | 7/2011 | Bailey et al. |
| 2011/0175745 A1 | 7/2011 | Atwell et al. |
| 2011/0301902 A1 | 12/2011 | Panagas et al. |
| 2012/0062706 A1 | 3/2012 | Keshavmurthy et al. |
| 2012/0120391 A1 | 5/2012 | Dold et al. |
| 2012/0120415 A1 | 5/2012 | Steffensen et al. |
| 2012/0154577 A1 | 6/2012 | Yoshikawa et al. |
| 2012/0188559 A1 | 7/2012 | Becker et al. |
| 2012/0206808 A1 | 8/2012 | Brown et al. |
| 2012/0218563 A1 | 8/2012 | Spruck et al. |
| 2012/0262573 A1 | 10/2012 | Bridges et al. |
| 2012/0262728 A1 | 10/2012 | Bridges et al. |
| 2012/0265479 A1 | 10/2012 | Bridges et al. |
| 2012/0317826 A1 | 12/2012 | Jonas |
| 2013/0096873 A1 | 4/2013 | Rosengaus et al. |
| 2013/0100282 A1 | 4/2013 | Siercks et al. |
| 2013/0155386 A1 | 6/2013 | Bridges et al. |
| 2013/0162469 A1 | 6/2013 | Zogg et al. |
| 2014/0002806 A1 | 1/2014 | Buchel et al. |
| 2014/0028805 A1 | 1/2014 | Tohme et al. |

(56) References Cited

U.S. PATENT DOCUMENTS

FOREIGN PATENT DOCUMENTS

| | | |
|---|---|---|
| CN | 1290850 | 4/2001 |
| CN | 1290850 A | 4/2001 |
| CN | 1362692 A | 8/2002 |
| CN | 1531659 A | 9/2004 |
| CN | 101031817 A | 9/2007 |
| CN | 101203730 A | 6/2008 |
| CN | 101297176 A | 10/2008 |
| CN | 101427155 A | 5/2009 |
| CN | 201548192 U | 8/2010 |
| DE | 7704949 U1 | 6/1977 |
| DE | 3530922 A1 | 8/1984 |
| DE | 3827458 A1 | 2/1990 |
| DE | 10160090 A1 | 7/2002 |
| DE | 202004004945 U1 | 10/2004 |
| DE | 102004024171 A1 | 9/2005 |
| DE | 102005019058 A1 | 12/2005 |
| DE | 102006013185 A1 | 9/2007 |
| DE | 202006020299 U1 | 5/2008 |
| DE | 60319016 | 4/2009 |
| DE | 102007058692 A1 | 6/2009 |
| EP | 0166106 | 1/1986 |
| EP | 598523 A1 | 5/1994 |
| EP | 1067363 A2 | 1/2001 |
| EP | 1519141 | 3/2005 |
| EP | 1607767 A1 * | 12/2005 |
| EP | 2177868 A2 | 10/2009 |
| EP | 2136178 A1 | 12/2009 |
| EP | 2219011 A1 | 8/2010 |
| EP | 2259010 A1 | 12/2010 |
| EP | 2259013 A1 | 12/2010 |
| EP | 2446300 A1 | 5/2012 |
| GB | 2503179 A | 12/2013 |
| GB | 2503390 A | 12/2013 |
| GB | 2516528 A | 1/2015 |
| GB | 2518544 A | 3/2015 |
| GB | 2518769 A | 4/2015 |
| GB | 2518998 A | 4/2015 |
| JP | 57147800 | 9/1982 |
| JP | 5804881 | 3/1983 |
| JP | S5848881 A | 3/1983 |
| JP | 2184788 | 7/1990 |
| JP | H0331715 A | 2/1991 |
| JP | H0371116 A | 3/1991 |
| JP | H0465631 A | 3/1992 |
| JP | H05257005 | 10/1993 |
| JP | 5302976 | 11/1993 |
| JP | H05302976 A | 11/1993 |
| JP | 6097288 | 4/1994 |
| JP | H06265355 A | 9/1994 |
| JP | H074967 A | 1/1995 |
| JP | H08145679 A | 6/1996 |
| JP | H0914965 A | 1/1997 |
| JP | H102722 A | 1/1998 |
| JP | H10107357 A | 4/1998 |
| JP | H10317874 A | 12/1998 |
| JP | 11502629 A | 3/1999 |
| JP | H11513495 | 11/1999 |
| JP | 11337642 | 12/1999 |
| JP | 2000503476 A | 3/2000 |
| JP | 2000275042 A | 10/2000 |
| JP | 2000346645 A | 12/2000 |
| JP | 2001165662 A | 6/2001 |
| JP | 2001272468 | 10/2001 |
| JP | 2001284317 A | 10/2001 |
| JP | 2001353112 A | 12/2001 |
| JP | 2002089184 A | 3/2002 |
| JP | 2002098762 | 4/2002 |
| JP | 2002209361 A | 7/2002 |
| JP | 2004508954 A | 3/2004 |
| JP | 2004527751 | 9/2004 |
| JP | 3109969 U | 6/2005 |
| JP | 2005265700 A | 9/2005 |
| JP | 2006084460 A | 3/2006 |
| JP | 2006276012 | 10/2006 |
| JP | 2006276012 A | 10/2006 |
| JP | 2007504459 A | 3/2007 |
| JP | 2007165331 A | 6/2007 |
| JP | 2007523357 A | 8/2007 |
| JP | 2007256872 A | 10/2007 |
| JP | 2008514967 | 5/2008 |
| JP | 2008544215 A | 12/2008 |
| JP | 2009014639 A | 1/2009 |
| JP | 2011158371 A | 8/2011 |
| JP | 2013525787 A | 10/2011 |
| JP | 2012509464 A | 4/2012 |
| JP | 2012530909 A | 12/2012 |
| WO | 0177613 A1 | 10/2001 |
| WO | 02084327 | 10/2002 |
| WO | 03062744 A1 | 7/2003 |
| WO | 2004063668 | 7/2004 |
| WO | 2005026772 A2 | 3/2005 |
| WO | 2006052259 A1 | 5/2006 |
| WO | 2006055770 A2 | 5/2006 |
| WO | 2006133799 A1 | 12/2006 |
| WO | 2007084209 A2 | 7/2007 |
| WO | 2007124010 A2 | 11/2007 |
| WO | 2008052348 A1 | 5/2008 |
| WO | 2008119073 A2 | 10/2008 |
| WO | 2010057169 A2 | 5/2010 |
| WO | 2010141120 A2 | 12/2010 |
| WO | 2010148525 A1 | 12/2010 |
| WO | 2011107729 A1 | 9/2011 |
| WO | 2011112277 A1 | 9/2011 |
| WO | 2010148526 A1 | 12/2012 |

OTHER PUBLICATIONS

International Search Report of the International Searching Authority for Application No. PCT/US2012/034611; Date of Mailing Dec. 13, 2012.

Written Opinion of the International Searching Authority for Application No. PCT/US2012/034611; Date of Mailing Dec. 13, 2012.

Japanese Patent Application No. 2010-176909 filed Aug. 6, 2010; issued on Oct. 23, 2012.

Office Action for Japanese Patent Application No. 2010-176909 filed Aug. 6, 2010; issued on Mar. 19, 2013.

Optical Circulator (3-Ports & 4-Ports); [on-line technical data sheet]; Alliance Fiber Optic Products, Inc. REV.D Jan. 15, 2004; Retrieved from www.afop.com.

Super-Nyquist Operation of the AD9912 Yields a High RF Output Signal; Analog Devices, Inc., AN-939 Application Note; www.analog.com; Copyright 2007.

Nanona High Speed & Low Loss Optical Switch; [on-line technical data sheet]; [Retrieved Oct. 14, 2010]; Retrieved from http://www.bostonati.com/products/PI-FOS.pdf.

Making the Big Step from Electronics to Photonics by Modulating a Beam of Light with Electricity; May 18, 2005; [on-line]; [Retrieved May 7, 2009]; Cornell University News Service; Retrieved from http://www.news.cornell.edu/stories/May05/LipsonElectroOptical.ws.html.

EOSpace—High-Speed Switches; [on-line technical brochure]; [Retrieved May 18, 2009]; Retrieved from http://www.cospace.com/Switches.htm.

FARO Laser Tracker Ion; 2 pages; revised Apr. 23, 2010; FARO Technologies, Inc., www.lasertracker.faro.com.

Great Britain Search Report for Application No. GB1013200.9 dated Nov. 22, 2010.

AO Modulator—M040-8J-FxS; [online—technical data sheet]; Gooch & Housego; Nov. 2006; Retrieved from http://www.goochandhousego.com/.

2x2 High Speed Lithium Niobate Interferometric Switch; [on-line]; JDS Uniphase Corporation; 2007; Retrieved from www.jdsu.com.

Kester, Walt, Practical Analog Design Techniques, Analog Devices, Section 5, Undersampling Applications, Copyright 1995, pp. 5-1 to 5-34.

Optical Circulators Improve Bidirectional Fiber Systems; by Jay S. Van Delden; [online]; [Retrieved May 18, 2009]; Laser Focus World;

(56) References Cited

OTHER PUBLICATIONS

Retreived from http://www.laserfocusworld.com/display_article/28411/12/nonc/nonc/News/Optical-circulators-improve-bidirectional-fiber-systems.
Leica Absolute Tracker AT401-ASME B89.4.19-2006 Specifications; Hexagon Metrology; Leica Geosystems Metrology Products, Switzerland; 2 pages; www.leica-geosystems.com/metrology.
Lightvision—High Speed Variable Optical Attenuators (VOA); [online]; A publication of Lightwaves 2020, Feb. 1, 2008; Retrieved from http://www.lightwaves2020.com/home/.
LaserTRACER-measureing sub-micron in space; http://www.etalon-ag.com/index.php/en/products/lasertracer; 4 pages; Jun. 28, 2011; ETALON AG.
Computer Giants Embrace On-Chip Optics; Mar. 27, 2008; [on-line]; Optics.org; [Retrieved on Apr. 2, 2008]; Retrieved from http://optics.org/cws/article/research/33521.
MEMS Variable Optical Attenuators Single/Multi-Channel; [on-line]; Jan. 17, 2005; Retrieved from www.ozoptics.com.
PCMM System Specifications Leica Absolute Tracker and Leica T-Products; Hexagon Metrology; Leica Geosystems Metrology Products, Switzerland; 8 pages; www.leica-geosystems.com/metrology.
Poujouly, Stephane, et al., Digital Laser Range Finder: Phase-Shift Estimation by Undersampling Technique; IEEE, Copyright 1999.
RS Series Remote Controlled Optical Switch; [on-line technical data sheet]; Sercalo Microtechnology, Ltd. [Retrieved Oct. 14, 2010]; Retrieved from http://www.sercalo.com/document/PDFs/DataSheets/RS%20datasheet.pdf.
Tracker3; Ultra-Portable Laser Tracking System; 4 pages; 2010 Automated Precision Inc.; www.apisensor.com.
Chen, Junewen, "Novel Laser Range Finding Algorithms", Proceedings of SPIE, vol. 6100, Jan. 1, 2006, pp. 61001Q-61001Q-8, XP55031002, ISSN: 0277-786X, DOI: 10.1117/12.645131, the whole document.
International Search Report of the International Searching Authority for PCT/US2012/032715; Date of Mailing Jul. 5, 2012.
Ou-Yang, Mang, et al., "High-Dynamic-Range Laser Range Finders Based on a Novel Multimodulated Frequency Method", Optical Engineering, vol. 45, No. 12, Dec. 2006, p. 123603, XP55031001, ISSN: 0091-3286, DOI: 10.1117/1.2402517, the whole document.
Poujouly, Stephane, et al., "A Twofold Modulation Frequency Laser Range Finder", Journal of Optics A: Pure and Applied Optics, Institute of Physics Publishing, Bristol, GB, vol. 4, No. 6, Nov. 1, 2002, pp. S356-S363, XP020080997, ISSN: 1464-4258, DOI: 10.1088/1464-4258/4/6/380, the whole document.
Written Opinion of the International Searching Authority for PCT/US2012/032715; Date of Mailing Jul. 5, 2012.
International Search Report of the International Searching Authority for Application No. PCT/US2012/030835; Date of Mailing Jul. 23, 2012.
International Search Report of the International Searching Authority for Application No. PCT/US2012/031368; Date of Mailing Jul. 18, 2012.
International Search Report of the International Searching Authority for Application No. PCT/US2012/033477; Date of Mailing Jul. 20, 2012.
Leica Laser Tracker System, Leica Geosystems AG, Jan. 1, 1999, XP002678836, Retrieved from the Internet: URL:http://www.a-solution.com.au/pages/downloads/LTD500_Brochure_EN.pdf [retrieved on 2012] the whole document.
Written Opinion of the International Searching Authority for Application No. PCT/US2012/030835; Date of Mailing Jul. 23, 2012.
Written Opinion of the International Searching Authority for Application No. PCT/US2012/031368; Date of Mailing Jul. 18, 2012.
Written Opinion of the International Searching Authority for Application No. PCT/US2012/033477; Date of Mailing Jul. 20, 2012.
International Search Report of the International Searching Authority for Application No. PCT/2012/030225; Date of Mailing Sep. 28, 2012.
International Search Report of the International Searching Authority for Application No. PCT/US2012/032971; Date of Mailing Sep. 3, 2012.
International Search Report of the International Searching Authority for Application No. PCT/US2012/0033435; Date of Mailing Sep. 17, 2012.
International Search Report of the International Seracrhing Aurhority for Application No. PCT/YS2012/033720; Date of Mailing Sep. 26, 2012.
Written Opinion of the International Searching Authority for Application No. PCT/US2012/030225; Date of Mailing Sep. 28, 2012.
Written Opinion of the International Searching Authority for Application No. PCT/US2012/032971; Date of Mailing Sep. 3, 2012.
Written Opinion of the International Searching Authority for Application No. PCT/US2012/033435; Date of Mailing Sep. 17, 2012.
Written Opinion of the International Searching Authority for Application No. PCT/US2012/033720; Date of Mailing Sep. 26, 2012.
Chinese Office Action issued Sep. 22, 2013 for Patent Application No. 201010251189.3.
International Preliminary Report on Patentability for International Application Serial No. PCT/US2012/030225. International filing date Mar. 23, 2012. Date of Issuance Oct. 15, 2013.
International Preliminary Report on Patentability for International Application Serial No. PCT/US2012/030835. International filing date Mar. 28, 2012. Date of Issuance Oct. 15, 2013.
International Preliminary Report on Patentability for International Application Serial No. PCT/US2012/032715. International filing date Apr. 9, 2012. Date of Issuance Oct. 15, 2013.
International Preliminary Report on Patentability for International Application Serial No. PCT/US2012/032970. International filing date Apr. 11, 2012. Date of Issuance Oct. 15, 2013.
International Preliminary Report on Patentability for International Application Serial No. PCT/US2012/032971. International filing date Apr. 11, 2012. Date of Issuance Oct. 15, 2013.
International Preliminary Report on Patentability for International Application Serial No. PCT/US2012/032972. International filing date Apr. 11, 2012. Date of Issuance Oct. 15, 2013.
International Preliminary Report on Patentability for International Application Serial No. PCT/US2012/032990. International filing date Apr. 11, 2012. Date of Issuance Oct. 15, 2013.
International Preliminary Report on Patentability for International Application Serial No. PCT/US2012/033435. International filing date Apr. 13, 2012. Date of Issuance Oct. 15, 2013.
International Preliminary Report on Patentability for International Application Serial No. PCT/US2012/033477. International filing date Apr. 13, 2012. Date of Issuance Oct. 15, 2013.
International Preliminary Report on Patentability for International Application Serial No. PCT/US2012/033720. International filing date Apr. 16, 2012. Date of Issuance Oct. 15, 2013.
International Preliminary Report on Patentability for International Application Serial No. PCT/US2012/031368. International filing date Mar. 30, 2012. Date of Issuance Oct. 15, 2013.
Matsumaru, K., "Mobile Robot with Preliminary-Announcement and Display Function of Forthcoming Motion Using Projection Equipment," Robot and Human Interactive Communication, 2006. RO-MAN06. The 15th IEEE International Symposium, pp. 443-450, Sep. 6-8, 2006.
Chinese Search Report for Chinese Application No. 201010251189; Dated Sep. 10, 2013.
International Search Report of the International Searching Authority for Application No. PCT/US2012/032970; Date of Mailing Nov. 28, 2012.
International Search Report of the International Searching Authority for Application No. PCT/US2012/032972; Date of Mailing Nov. 28, 2012.
International Search Report of the International Searching Authority for Application No. PCT/US2012/032990; Date of Mailing Dec. 4, 2012.
Written Opinion of the International Searching Authority for Application No. PCT/US2012/032970; Date of Mailing Nov. 28, 2012.
Written Opinion of the International Searching Authority for Application No. PCT/US2012/032972; Date of Mailing Nov. 28, 2012.

(56) References Cited

OTHER PUBLICATIONS

Written Opinion of the International Searching Authority for Application No. PCT/US2012/032990; Date of Mailing Dec. 4, 2012.
JP Office Action for Application No. 2014-505151 mailed Apr. 30, 2014.
DE Office Action for Application No. 102010038955.2 issued Apr. 23, 2014.
"A New Generation of Total Stations from Leica Geosystems." K. Zeiske. Leica Geosystems AG, May 1999, 8 pages.
"Fiber Optic Rotary Joints Product Guide"; Moog Inc; MS1071, rev. 2; p. 1-4; 2010; Retrieved on Nov. 13, 2013 from http://www.moog.com/literature/ICD/Moog-Fiber-Optic-Rotary-Joint_Catalog-en.pdf.
"Technical Brief: Fiber Optic Rotary Joint"; Document No. 303; Moog Inc; p. 1-6; 2008; Retrieved on Nov. 13, 2013 from http://www.moog.com/literature/MCG/FORJtechbrief.pdf.
CN Office Action for Chinese Patent Application No. 201280018615.6(PCT/US2012/032715) Mailed on Nov. 18, 2014, 3 pages.
Cuypers, et al "Optical Measurement Techniques for Mobile and Large-Scale Dimensional Metrology" (2009) ; Optics and Lasers in Engineering pp. 292-300; vol. 47; Elsevier Ltd. XP 25914917A.
Hanwei Xiong et al: "The Development of Optical Fringe Measurement System integrated with a CMM for Products Inspection." Proceedings of SPIE, vol. 7855, Nov. 3, 2010, pp. 78551W-7855W-8, XP055118356. ISSN: 0277-786X.
Integrated Optical Amplitude Modulator; [on-line technical data sheet]; [Retrieved Oct. 14, 2010]; Jenoptik; Retrieved from http://www.jenoptik.com/cms/products.nsf/0/A6DF20B50AEE7819C12576FE0074E8E6/$File/amplitudemodulators_en.pdf?Open.
Katowski "Optical 3-D Measurement Techniques-Applications in inspection, quality control and robotic" Vienna, Austria, Sep. 18-20, 1989.
Leica Absolute Tracker AT401 Powerlock, Dec. 18, 2014.
Leica Geosystems: "TPS1100 Professional Series", 1999, Retrieved from the Internet: URL:http://www.estig.ibeja.pt/-legvm/top_civil/TPS1100%20-%20A%20New%20Generation%20of%20Total%20Stations.pdf, [Retrieved on Jul. 2012] the whole document.
New River Kinematics, SA Arm—"The Ultimate Measurement Software for Arms, Software Release!", SA Sep. 30, 2010, [On-line], http://www.kinematics.com/news/software-release-sa20100930.html (1 of 14), [Retrieved Apr. 13, 2011 11:40:47 AM].
Parker, et al "Instrument for Setting Radio Telescope Surfaces" (4 pp) XP 55055817A.
Rahman, et al., "Spatial-Geometric Approach to Physical Mobile Interaction Based on Accelerometer and IR Sensory Data Fusion", ACM Transactions on Multimedia Computing, Communications and Applications, vol. 6, No. 4, Article 28, Publication date: Novembe.
Sladek, J., et al: "The Hybrid Contact-Optical Coordinate Measuring System." Measurement, vol. 44, No. 3, Mar. 1, 2011, pp. 503-510.
Stone, et al. "Automated Part Tracking on the Construction Job Site" 8 pp; XP 55055816A; National Institute of Standards and Technology.
"DLP-Based Structured Light 3D Imaging Technologies and Applications" by J. Geng; Proceedings of SPIE, vol. 7932. Published Feb. 11, 2011, 15 pages.
English Abstract of CN1362692; Applicant: Univ Tianjin; Published Date: Aug. 7, 2002; 1 pg.
English Abstract of JP2005010585; Applicant: TDK Corp; Published Date: Jan. 13, 2005; 1 pg.
English Abstract of JPH06214186; Applicant: Eastman Kodak CO LTD; Published Date: Aug. 5, 1994; 1 pg.
English Abstract of JPH09113223; Applicant: Fuji Xerox CO LTD; Published Date: May 2, 1997; 1 pg.
James H. Burge et al, Use of a commerical laser tracker for optical alignment, Proc, of SPIE vol. 6676, Sep. 21, 2007, pp. 66760E-1-66760E-12.
Chen, Jihua, et al, Research on the Principle of 5/6-DOF Laser Tracking Metrology, Journal of Astronautic Metrology and Measurement vol. 27, No. 3, May 31, 2007, pp. 58-62.

* cited by examiner

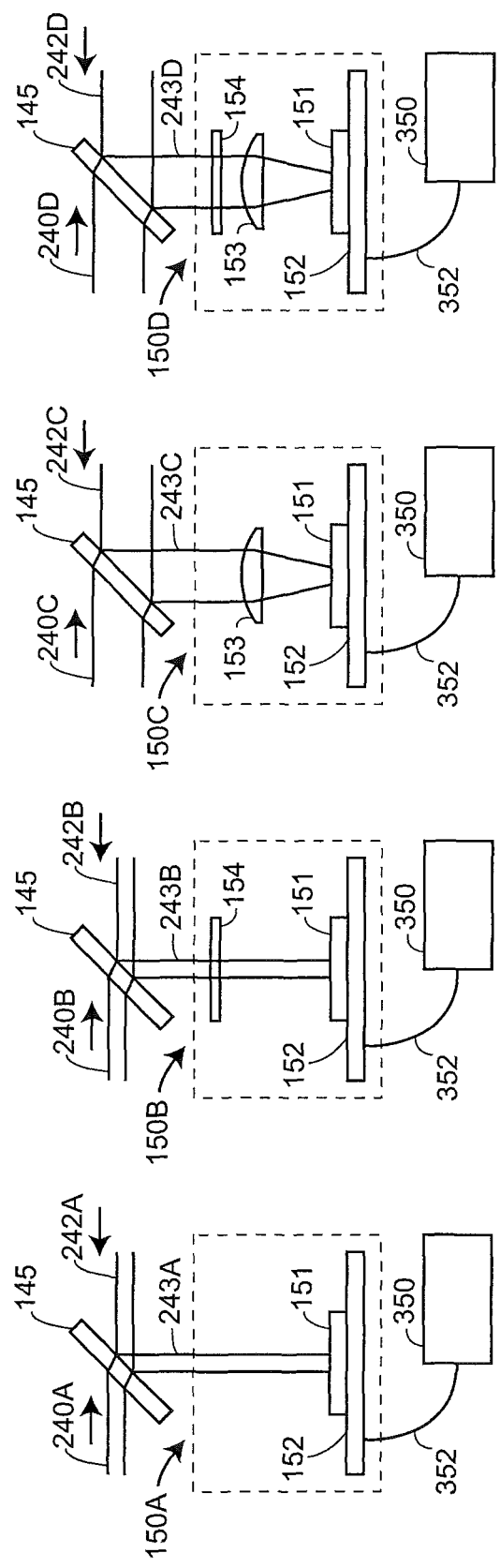

ABSOLUTE DISTANCE METER BASED ON AN UNDERSAMPLING METHOD

CROSS REFERENCE TO RELATED APPLICATIONS

The present application claims the benefit of U.S. Provisional Patent Application No. 61/592,049 filed Jan. 30, 2012, and U.S. Provisional Patent Application No. 61/475,703 filed Apr. 15, 2011, the entire contents of both of which are hereby incorporated by reference.

BACKGROUND

The present disclosure relates to a coordinate measuring device. One set of coordinate measurement devices belongs to a class of instruments that measure the three-dimensional (3D) coordinates of a point by sending a laser beam to the point. The laser beam may impinge directly on the point or on a retroreflector target in contact with the point. In either case, the instrument determines the coordinates of the point by measuring the distance and the two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest.

The laser tracker is a particular type of coordinate-measuring device that tracks the retroreflector target with one or more laser beams it emits. Coordinate-measuring devices closely related to the laser tracker are the laser scanner and the total station. The laser scanner steps one or more laser beams to points on a surface. It picks up light scattered from the surface and from this light determines the distance and two angles to each point. The total station, which is most often used in surveying applications, may be used to measure the coordinates of diffusely scattering or retroreflective targets. Hereinafter, the term laser tracker is used in a broad sense to include laser scanners and total stations.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube corner within the sphere, the perpendicular distance from the vertex to any surface on which the SMR rests remains constant, even as the SMR is rotated. Consequently, the laser tracker can measure the 3D coordinates of a surface by following the position of an SMR as it is moved over the surface. Stating this another way, the laser tracker needs to measure only three degrees of freedom (one radial distance and two angles) to fully characterize the 3D coordinates of a surface.

One type of laser tracker contains only an interferometer (IFM) without an absolute distance meter (ADM). If an object blocks the path of the laser beam from one of these trackers, the IFM loses its distance reference. The operator must then track the retroreflector to a known location to reset to a reference distance before continuing the measurement. A way around this limitation is to put an ADM in the tracker. The ADM can measure distance in a point-and-shoot manner, as described in more detail below. Some laser trackers contain only an ADM without an interferometer. U.S. Pat. No. 7,352,446 ('446) to Bridges et al., the contents of which are herein incorporated by reference, describes a laser tracker having only an ADM (and no IFM) that is able to accurately scan a moving target. Prior to the '446 patent, absolute distance meters were too slow to accurately find the position of a moving target.

A gimbal mechanism within the laser tracker may be used to direct a laser beam from the tracker to the SMR. Part of the light retroreflected by the SMR enters the laser tracker and passes onto a position detector. A control system within the laser tracker can use the position of the light on the position detector to adjust the rotation angles of the mechanical axes of the laser tracker to keep the laser beam centered on the SMR. In this way, the tracker is able to follow (track) an SMR that is moved over the surface of an object of interest.

Angle measuring devices such as angular encoders are attached to the mechanical axes of the tracker. The one distance measurement and two angle measurements performed by the laser tracker are sufficient to completely specify the three-dimensional location of the SMR.

Several laser trackers are available or have been proposed for measuring six, rather than the ordinary three, degrees of freedom. Exemplary six degree-of-freedom (six-DOF) systems are described by U.S. Pat. No. 7,800,758 ('758) to Bridges et al., the contents of which are herein incorporated by reference, and U.S. Published Patent Application No. 2010/0128259 to Bridges et al., the contents of which are herein incorporated by reference.

One type of ADM in use today determines the distance to a target by measuring the shift in phase of a sinusoidally modulated beam of light as the beam travels from the measurement device to a target and back. To measure the shift in phase of the light, the detected light is downconverted using one or more mixers and then sent to an analog-to-digital converter (ADC) to obtain measurement samples that are processed to determine the phase. In this scheme, the mixer adds complexity and cost to the ADM design, and therefore it would be better if it were eliminated. Another problem with the use of mixers in a downconversion stage is that a mixer may undergo a shift in phase with variation in the power level of an RF signal entering the mixer, thereby producing an error in the calculated distance to the measured target.

The paper "Digital laser range finder: phase-shift estimation by undersampling technique" by Poujouly et al., herein incorporated by reference, describes two methods for extracting phase in a phase-based distance meter. In the first method, a quadrature (I/Q) demodulation scheme is used in conjunction with digital filters and an automatic gain control (AGC). The accuracy obtained with the disclosed method is approximately 6 mm, which is about a factor of 1000 worse than that desired for the application considered herein. In the second method, a first frequency is used to modulate a laser. The modulated laser signal is sent to a target, and the detected signal is sampled at another frequency in an ADC to obtain sample values that can be used to calculate the phase shift of the modulated light. However, a single frequency is not sufficient to operate over a relatively large range since multiple modulation frequencies are required to determine the "unambiguity region" in which a measured target resides. The architecture disclosed does not permit this ambiguity to be removed.

U.S. Pat. No. 7,177,014 ('014) to Mori et al. discloses a method for measuring a distance to an object using an absolute distance meter based on an undersampling method. The method in this patent applies a first or a second modulation signal to modulate the optical power of a laser. The detected light is applied to a first ADC while an electrical signal of the same frequency is applied to a second ADC. The phase difference between the two ADC signals is used to calculate the distance to the object. However, the disclosed method does not provide good rejection of noise coming from the laser diode and the optical detectors because the second ADC signal is electrical only. Because the Mori patent does not disclose a distance meter used with a retroreflector but rather with objects such as [from the '014 patent] "an aluminum plate, a card board, a PC plate, a velvet cloth, a black paper, wood, and a painted plate," the distance accuracies are much lower than those possible with a retroreflector. For dimensional measurement systems in which a retroreflector is used, there is generally a need for much higher accuracies, and in these cases it is important that an optical reference signal be provided to remove common mode noise associated with the laser and optical detectors. In addition, the methods the '014 patent provides for resolving range ambiguities are restrictive. In most practical systems requiring relatively high accuracy, it is necessary to provide a way to apply three or more modulation frequencies to remove ambiguity.

What is needed is a relatively inexpensive method for obtaining relatively high accuracy absolute distance measurements.

SUMMARY

A dimensional measurement system including a dimensional measurement device and a target includes: a frequency standard generator that produces a standard electrical signal having a standard frequency; and a signal generator configured to produce in a first mode a first electrical signal having a first frequency and a second electrical signal having a second frequency, the first and second frequencies derived from the standard electrical signal, wherein the first frequency divided by the second frequency is less than two and the first frequency is different than the second frequency. The system also includes: a first light source producing a first light; an optical system configured to send a first portion of the first light out of the measurement device as a first beam of light and to send a second portion of the first light to a reference optical detector, the first beam and the second portion having a first optical characteristic modulated at the first frequency; the target configured as a retroreflector to receive the first beam and to return a second beam of light to the optical system; the optical system further configured to send a third portion of the second beam of light to a measure optical detector, the measure optical detector configured to convert the third portion into a first measure electrical signal, the reference optical detector configured to convert the second portion into a first reference electrical signal. The system further includes: a first analog-to-digital converter channel having a first sample port, a first signal port, and a first data port, the first analog-to-digital converter channel configured in the first mode to receive the second electrical signal at the first sample port, to receive the first measure electrical signal at the first signal port, to provide at the first data port a plurality of first digital measure values representative of the first measure electrical signal; and a second analog-to-digital converter channel having a second sample port, a second signal port, and a second data port, the second analog-to-digital converter channel configured in the first mode to receive the second electrical signal at the second sample port, to receive the first reference electrical signal at the second signal port, to provide at the second data port a plurality of first digital reference values representative of the first reference electrical signal at different times; and a processor configured in the first mode to calculate a first distance from the dimensional measurement device to the target, the calculated first distance based at least in part on the first frequency, the second frequency, the plurality of first digital measure values, the plurality of first digital reference values, and the speed of light in air.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIGS. 4A and 4B, shows two types of prior art afocal beam expanders;

FIG. 6A-D are schematic figures that show four types of prior art position detector assemblies;

DETAILED DESCRIPTION

Figure 1:
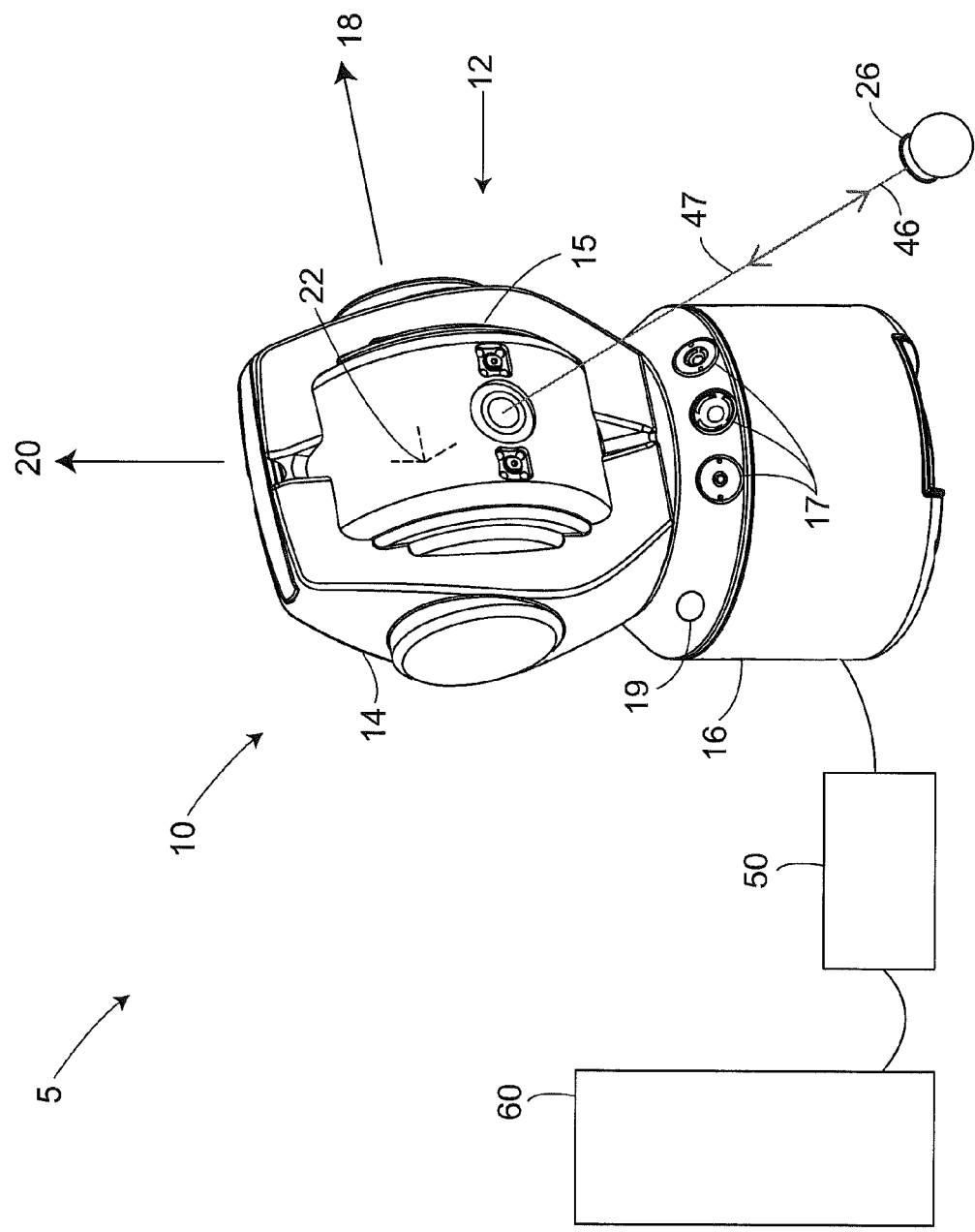
FIG. 1 is a perspective view of a laser tracker system with a retroreflector target in accordance with an embodiment of the present invention.

An exemplary laser tracker system 5 illustrated in FIG. 1 includes a laser tracker 10, a retroreflector target 26, an optional auxiliary unit processor 50, and an optional auxiliary computer 60. An exemplary gimbaled beam-steering mechanism 12 of laser tracker 10 comprises a zenith carriage 14 mounted on an azimuth base 16 and rotated about an azimuth axis 20. A payload 15 is mounted on the zenith carriage 14 and rotated about a zenith axis 18. Zenith axis 18 and azimuth axis 20 intersect orthogonally, internally to tracker 10, at gimbal point 22, which is typically the origin for distance measurements. A laser beam 46 virtually passes through the gimbal point 22 and is pointed orthogonal to zenith axis 18. In other words, laser beam 46 is approximately perpendicular to any plane parallel to both the zenith axis 18 and the azimuth axis 20. Outgoing laser beam 46 is pointed in the desired direction by rotation of payload 15 about zenith axis 18 and by rotation of zenith carriage 14 about azimuth axis 20. A zenith angular encoder, internal to the tracker, is attached to a zenith mechanical axis aligned to the zenith axis 18. An azimuth angular encoder, internal to the tracker, is attached to an azimuth mechanical axis aligned to the azimuth axis 20. The zenith and azimuth angular encoders measure the zenith and azimuth angles of rotation to relatively high accuracy. Outgoing laser beam 46 travels to the retroreflector target 26, which might be, for example, a spherically mounted retroreflector (SMR) as described above. By measuring the radial distance between gimbal point 22 and retroreflector 26, the rotation angle about the zenith axis 18, and the rotation angle about the azimuth axis 20, the position of retroreflector 26 is found within the spherical coordinate system of the tracker.

Outgoing laser beam 46 may include one or more laser wavelengths, as described hereinafter. For the sake of clarity and simplicity, a steering mechanism of the sort shown in FIG. 1 is assumed in the following discussion. However, other types of steering mechanisms are possible. For example, it is possible to reflect a laser beam off a mirror rotated about the azimuth and zenith axes. The techniques described herein are applicable, regardless of the type of steering mechanism.

Magnetic nests 17 may be included on the laser tracker for resetting the laser tracker to a "home" position for different sized SMRs—for example, 1.5, ⅞, and ½ inch SMRs. An on-tracker retroreflector 19 may be used to reset the tracker to a reference distance. In addition, an on-tracker mirror, not visible from the view of FIG. 1, may be used in combination with the on-tracker retroreflector to enable performance of a self-compensation, as described in U.S. Pat. No. 7,327,446, the contents of which are incorporated by reference.

Figure 2:
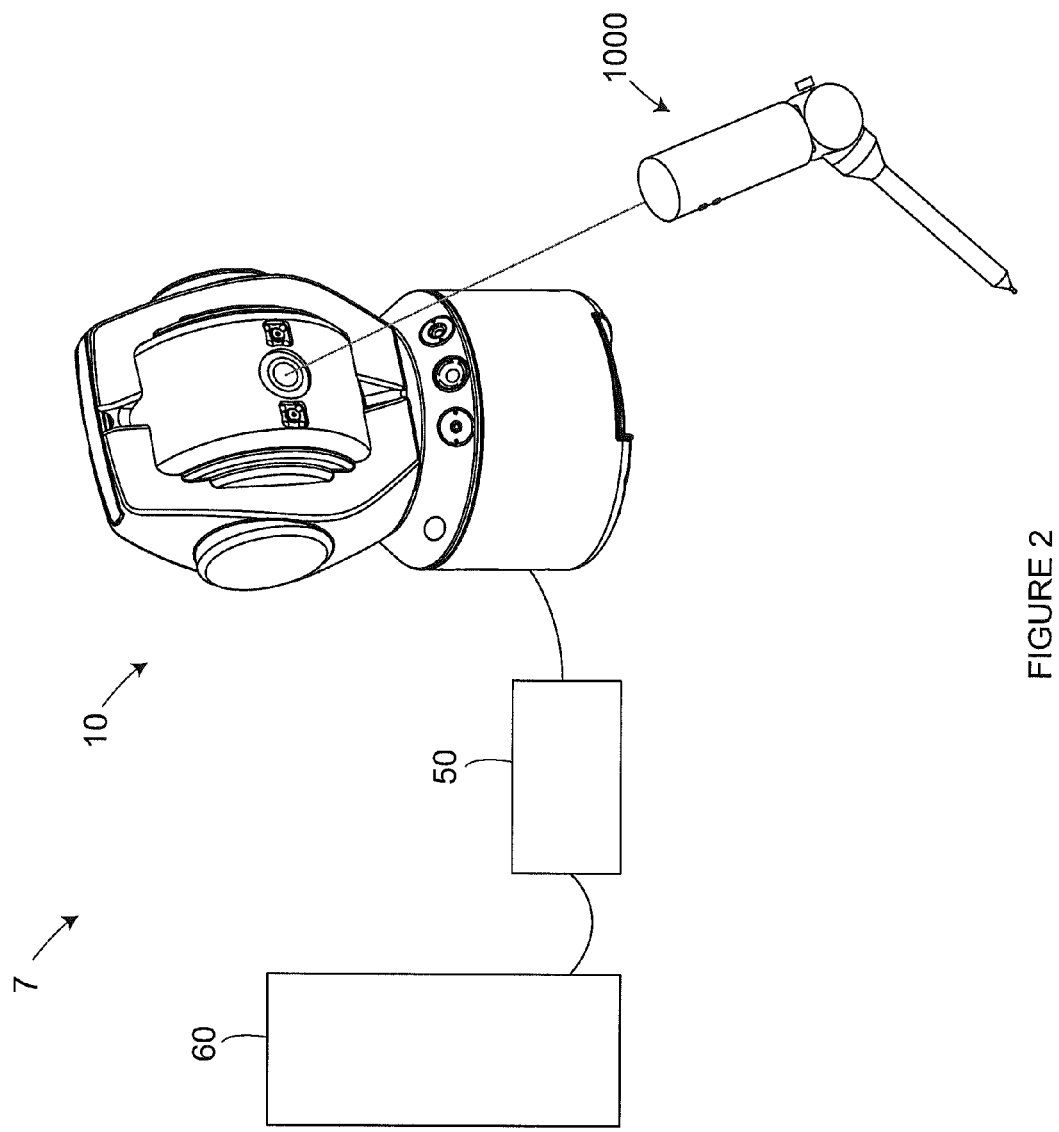
FIG. 2 is a perspective view of a laser tracker system with a six-DOF target in accordance with an embodiment of the present invention.

FIG. 2 shows an exemplary laser tracker system 7 that is like the laser tracker system 5 of FIG. 1 except that retroreflector target 26 is replaced with a six-DOF probe 1000. In FIG. 1, other types of retroreflector targets may be used. For example, a cateye retroreflector, which is a glass retroreflector in which light focuses to a small spot of light on a reflective rear surface of the glass structure, is sometimes used.

Figure 3:
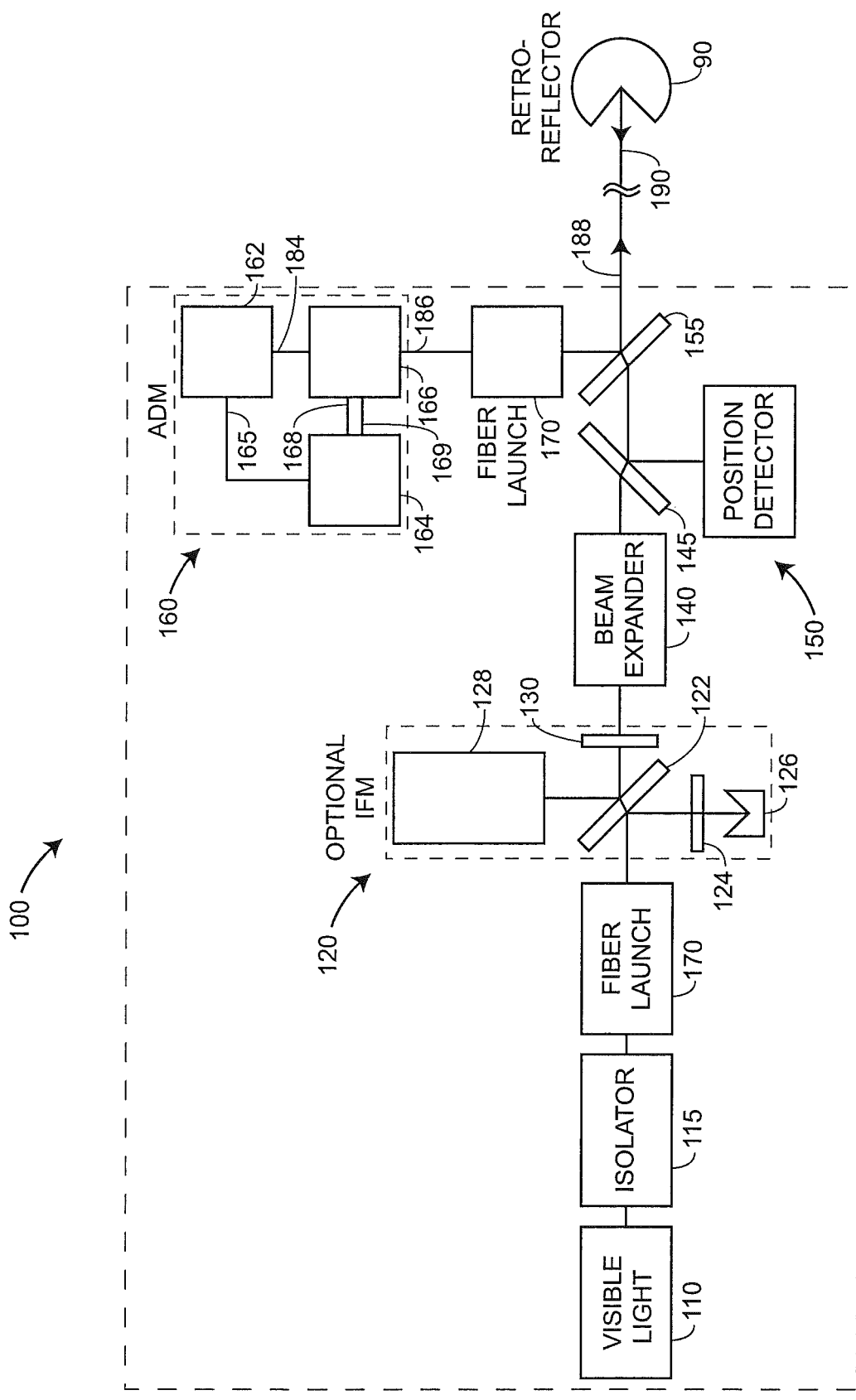
FIG. 3 is a block diagram describing elements of laser tracker optics and electronics in accordance with an embodiment of the present invention.

FIG. 3 is a block diagram showing optical and electrical elements in a laser tracker embodiment. It shows elements of a laser tracker that emit two wavelengths of light—a first wavelength for an ADM and a second wavelength for a visible pointer and for tracking. The visible pointer enables the user to see the position of the laser beam spot emitted by the tracker. The two different wavelengths are combined using a free-space beam splitter. Electrooptic (EO) system 100 includes visible light source 110, isolator 115, optional first fiber launch 170, optional interferometer (IFM) 120, beam expander 140, first beam splitter 145, position detector assembly 150, second beam splitter 155, ADM 160, and second fiber launch 170.

Visible light source 110 may be a laser, superluminescent diode, or other light emitting device. The isolator 115 may be a Faraday isolator, attenuator, or other device capable of reducing the light that reflects back into the light source. Optional IFM may be configured in a variety of ways. As a specific example of a possible implementation, the IFM may include a beam splitter 122, a retroreflector 126, quarter waveplates 124, 130, and a phase analyzer 128. The visible light source 110 may launch the light into free space, the light then traveling in free space through the isolator 115, and optional IFM 120. Alternatively, the isolator 115 may be coupled to the visible light source 110 by a fiber optic cable. In this case, the light from the isolator may be launched into free space through the first fiber-optic launch 170, as discussed herein below with reference to FIG. 5.

Figure 4:
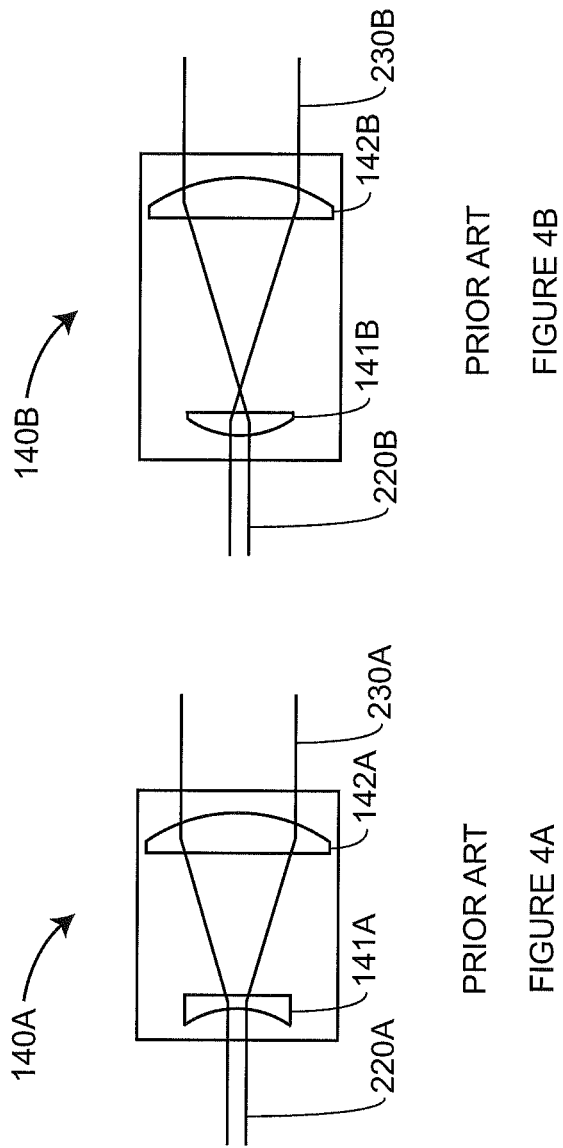
FIG. 4, which includes

Beam expander 140 may be set up using a variety of lens configurations, but two commonly used prior-art configurations are shown in FIGS. 4A, 4B. FIG. 4A shows a configuration 140A based on the use of a negative lens 141A and a positive lens 142A. A beam of collimated light 220A incident on the negative lens 141A emerges from the positive lens 142A as a larger beam of collimated light 230A. FIG. 4B shows a configuration 140B based on the use of two positive lenses 141B, 142B. A beam of collimated light 220B incident on a first positive lens 141B emerges from a second positive lens 142B as a larger beam of collimated light 230B. Of the light leaving the beam expander 140, a small amount reflects off the beam splitters 145, 155 on the way out of the tracker and is lost. That part of the light that passes through the beam splitter 155 is combined with light from the ADM 160 to form a composite beam of light 188 that leaves that laser tracker and travels to the retroreflector 90.

In an embodiment, the ADM 160 includes a light source 162, ADM electronics 164, a fiber network 166, an interconnecting electrical cable 165, and interconnecting optical fibers 168, 169, 184, 186. ADM electronics send electrical modulation and bias voltages to light source 162, which may, for example, be a distributed feedback laser that operates at a wavelength of approximately 1550 nm. In an embodiment, the fiber network 166 may be the prior art fiber-optic network 420A shown in FIG. 8A. In this embodiment, light from the light source 162 in FIG. 3 travels over the optical fiber 184, which is equivalent to the optical fiber 432 in FIG. 8A.

Figure 8A:
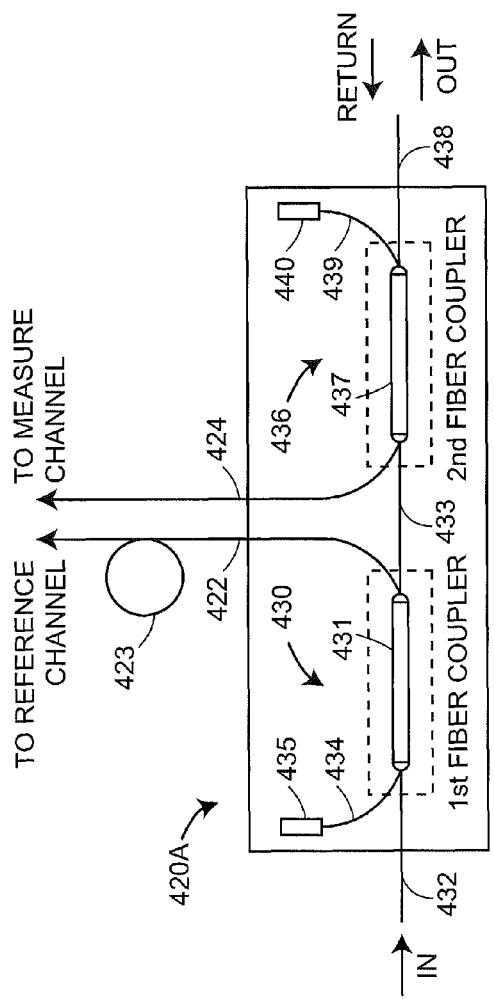
FIGS. 8A and 8B are schematic figures showing fiber-optic elements within a prior art fiber-optic network.

The fiber network of FIG. 8A includes a first fiber coupler 430, a second fiber coupler 436, and low-transmission reflectors 435, 440. The light travels through the first fiber coupler 430 and splits between two paths, the first path through optical fiber 433 to the second fiber coupler 436 and the second path through optical fiber 422 and fiber length equalizer 423. Fiber length equalizer 423 connects to fiber length 168 in FIG. 3, which travels to the reference channel of the ADM electronics 164. The purpose of fiber length equalizer 423 is to match the length of optical fibers traversed by light in the reference channel to the length of optical fibers traversed by light in the measure channel. Matching the fiber lengths in this way reduces ADM errors caused by changes in the ambient temperature. Such errors may arise because the effective optical path length of an optical fiber is equal to the average index of refraction of the optical fiber times the length of the fiber. Since the index of refraction of the optical fibers depends on the temperature of the fiber, a change in the temperature of the optical fibers causes changes in the effective optical path lengths of the measure and reference channels. If the effective optical path length of the optical fiber in the measure channel changes relative to the effective optical path length of the optical fiber in the reference channel, the result will be an apparent shift in the position of the retroreflector target 90, even if the retroreflector target 90 is kept stationary. To get around this problem, two steps are taken. First, the length of the fiber in the reference channel is matched, as nearly as possible, to the length of the fiber in the measure channel. Second, the measure and reference fibers are routed side by side to the extent possible to ensure that the optical fibers in the two channels see nearly the same changes in temperature.

The light travels through the second fiber optic coupler 436 and splits into two paths, the first path to the low-reflection fiber terminator 440 and the second path to optical fiber 438, from which it travels to optical fiber 186 in FIG. 3. The light on optical fiber 186 travels through to the second fiber launch 170.

Figure 5:
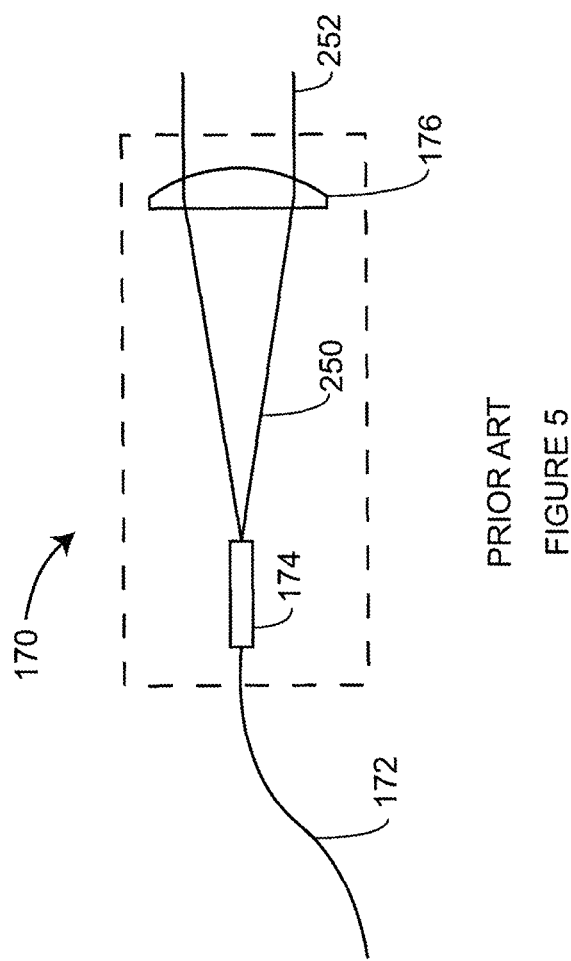
FIG. 5 shows a prior art fiber-optic beam launch.

In an embodiment, fiber launch 170 is shown in prior art FIG. 5. The light from optical fiber 186 of FIG. 3 goes to fiber 172 in FIG. 5. The fiber launch 170 includes optical fiber 172, ferrule 174, and lens 176. The optical fiber 172 is attached to ferrule 174, which is stably attached to a structure within the laser tracker 10. If desired, the end of the optical fiber may be polished at an angle to reduce back reflections. The light 250 emerges from the core of the fiber, which may be a single mode optical fiber with a diameter of between 4 and 12 micrometers, depending on the wavelength of the light being used and the particular type of optical fiber. The light 250 diverges at an angle and intercepts lens 176, which collimates it. The method of launching and receiving an optical signal through a single optical fiber in an ADM system was described in reference to FIG. 3 in U.S. Pat. No. '758.

Referring to FIG. 3, the beam splitter 155 may be a dichroic beam splitter, which transmits different wavelengths than it reflects. In an embodiment, the light from the ADM 160 reflects off dichroic beam splitter 155 and combines with the light from the visible laser 110, which is transmitted through the dichroic beam splitter 155. The composite beam of light 188 travels out of the laser tracker to retroreflector 90 as a first beam, which returns a portion of the light as a second beam. That portion of the second beam that is at the ADM wavelength reflects off the dichroic beam splitter 155 and returns to the second fiber launch 170, which couples the light back into the optical fiber 186.

In an embodiment, the optical fiber 186 corresponds to the optical fiber 438 in FIG. 8A. The returning light travels from optical fiber 438 through the second fiber coupler 436 and splits between two paths. A first path leads to optical fiber 424 that, in an embodiment, corresponds to optical fiber 169 that leads to the measure channel of the ADM electronics 164 in FIG. 3. A second path leads to optical fiber 433 and then to the first fiber coupler 430. The light leaving the first fiber coupler 430 splits between two paths, a first path to the optical fiber 432 and a second path to the low reflectance termination 435. In an embodiment, optical fiber 432 corresponds to the optical fiber 184, which leads to the light source 162 in FIG. 3. In most cases, the light source 162 contains a built-in Faraday isolator that minimizes the amount of light that enters the light source from optical fiber 432. Excessive light fed into a laser in the reverse direction can destabilize the laser.

Figure 7A:
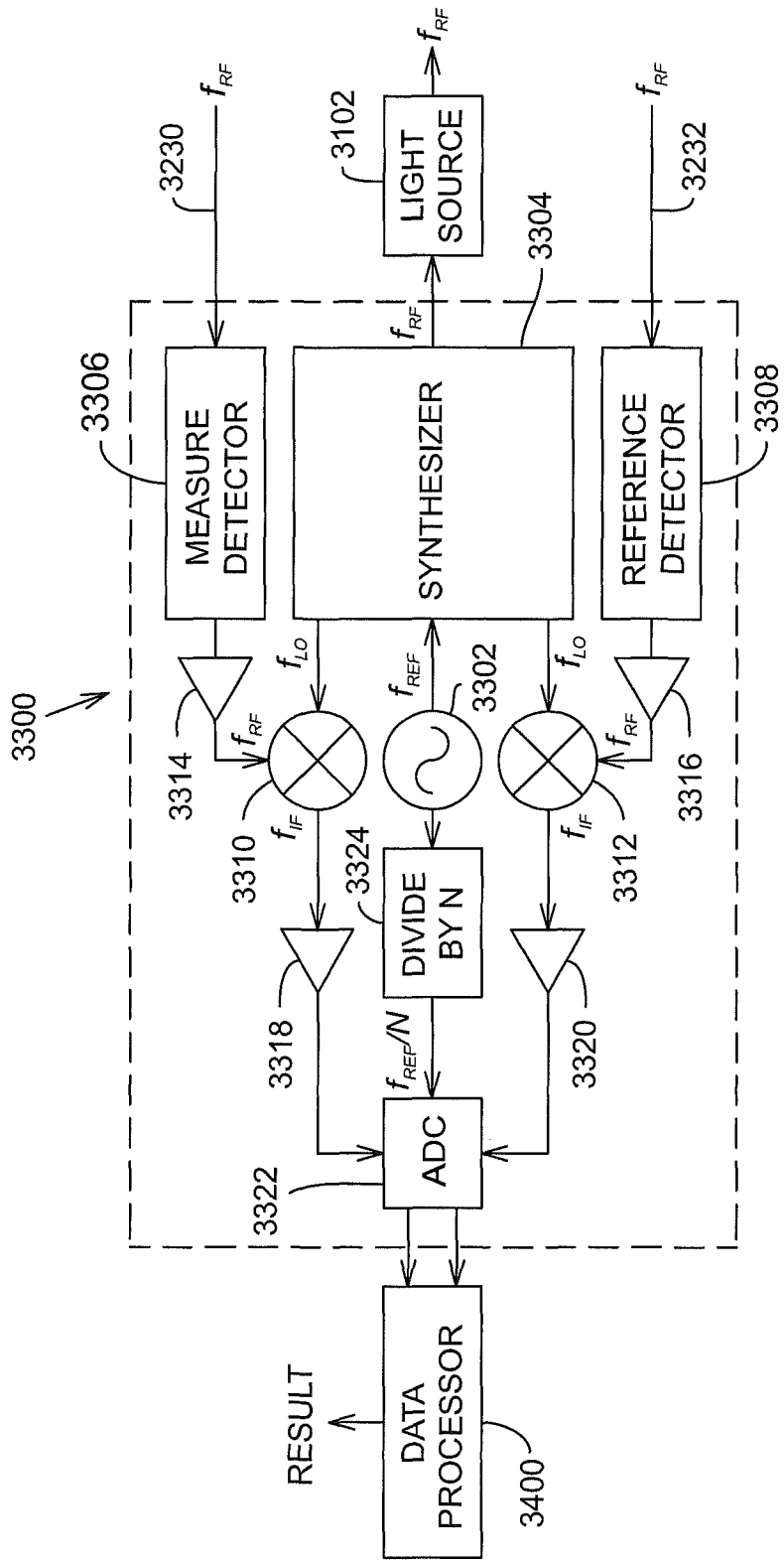
FIG. 7A is a block diagram of electrical and electro-optical elements within a prior art ADM.

The light from the fiber network 166 enters ADM electronics 164 through optical fibers 168, 169. An embodiment of prior art ADM electronics is shown in FIG. 7A. Optical fiber 168 in FIG. 3 corresponds to optical fiber 3232 in FIG. 7A, and optical fiber 169 in FIG. 3 corresponds to optical fiber 3230 in FIG. 7A. Referring now to FIG. 7A, ADM electronics 3300 includes a frequency reference 3302, a synthesizer 3304, a measure detector 3306, a reference detector 3308, a measure mixer 3310, a reference mixer 3312, conditioning electronics 3314, 3316, 3318, 3320, a divide-by-N prescaler 3324, and an analog-to-digital converter (ADC) 3322. The frequency reference, which might be an oven-controlled crystal oscillator (OCXO), for example, sends a reference frequency $f_{REF}$, which might be 10 MHz, for example, to the synthesizer, which generates two electrical signals—one signal at a frequency $f_{RF}$ and two signals at frequency $f_{LO}$. The signal $f_{RF}$ goes to the light source 3102, which corresponds to the light source 162 in FIG. 3. The two signals at frequency $f_{LO}$ go to the measure mixer 3310 and the reference mixer 3312. The light from optical fibers 168, 169 in FIG. 3 appear on fibers 3232, 3230 in FIG. 7A, respectively, and enter the reference and measure channels, respectively. Reference detector 3308 and measure detector 3306 convert the optical signals into electrical signals. These signals are conditioned by electrical components 3316, 3314, respectively, and are sent to mixers 3312, 3310, respectively. The mixers produce a frequency $f_{IF}$ equal to the absolute value of $f_{LO}-f_{RF}$. The signal $f_{RF}$ may be a relatively high frequency, for example, 2 GHz, while the signal $f_{IF}$ may have a relatively low frequency, for example, 10 kHz.

The reference frequency $f_{REF}$ is sent to the prescaler 3324, which divides the frequency by an integer value. For example, a frequency of 10 MHz might be divided by a 40 to obtain an output frequency of 250 kHz. In this example, the 10 kHz signals entering the ADC 3322 would be sampled at a rate of 250 kHz, thereby producing 25 samples per cycle. The signals from the ADC 3322 are sent to a data processor 3400, which might, for example, be one or more digital signal processor (DSP) units located in ADM electronics 164 of FIG. 3.

The method for extracting a distance is based on the calculation of phase of the ADC signals for the reference and measure channels. This method is described in detail in U.S. Pat. No. 7,701,559 ('559) to Bridges et al., the contents of which are herein incorporated by reference. Calculation includes use of equations (1)-(8) of U.S. Pat. No. '559. In addition, when the ADM first begins to measure a retroreflector, the frequencies generated by the synthesizer are changed some number of times (for example, three times), and the possible ADM distances calculated in each case. By comparing the possible ADM distances for each of the selected frequencies, an ambiguity in the ADM measurement is removed. The equations (1)-(8) of U.S. Pat. No. '559 combined with synchronization methods described with respect to FIG. 5 of U.S. Pat. No. '559 and the Kalman filter methods described in U.S. Pat. No. '559 enable the ADM to measure a moving target. In other embodiments, other methods of obtaining absolute distance measurements, for example, by using pulsed time-of-flight rather than phase differences, may be used.

The part of the return light beam 190 that passes through the beam splitter 155 arrives at the beam splitter 145, which sends part of the light to the beam expander 140 and another part of the light to the position detector assembly 150. The light emerging from the laser tracker 10 or EO system 100 may be thought of as a first beam and the portion of that light reflecting off the retroreflector 90 or 26 as a second beam. Portions of the reflected beam are sent to different functional elements of the EO system 100. For example, a first portion may be sent to a distance meter such as an ADM 160 in FIG. 3. A second portion may be sent to a position detector assembly 150. In some cases, a third portion may be sent to other functional units such as an optional interferometer (120). It is important to understand that, although, in the example of FIG. 3, the first portion and the second portion of the second beam are sent to the distance meter and the position detector after reflecting off beam splitters 155 and 145, respectively, it would have been possible to transmit, rather than reflect, the light onto a distance meter or position detector.

Figure 6F:
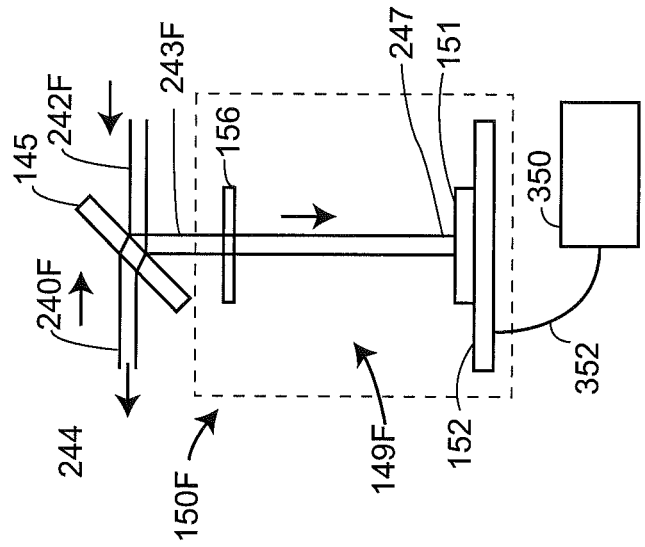
FIGS. 6E and 6F are schematic figures showing position detector assemblies according to embodiments of the present invention.

Four examples of prior art position detector assemblies 150A-150D are shown in FIGS. 6A-D. FIG. 6A depicts the simplest implementation, with the position detector assembly including a position sensor 151 mounted on a circuit board 152 that obtains power from and returns signals to electronics box 350, which may represent electronic processing capability at any location within the laser tracker 10, auxiliary unit 50, or external computer 60. FIG. 6B includes an optical filter 154 that blocks unwanted optical wavelengths from reaching the position sensor 151. The unwanted optical wavelengths may also be blocked, for example, by coating the beam splitter 145 or the surface of the position sensor 151 with an appropriate film. FIG. 6C includes a lens 153 that reduces the size of the beam of light. FIG. 6D includes both an optical filter 154 and a lens 153.

Figure 6E:
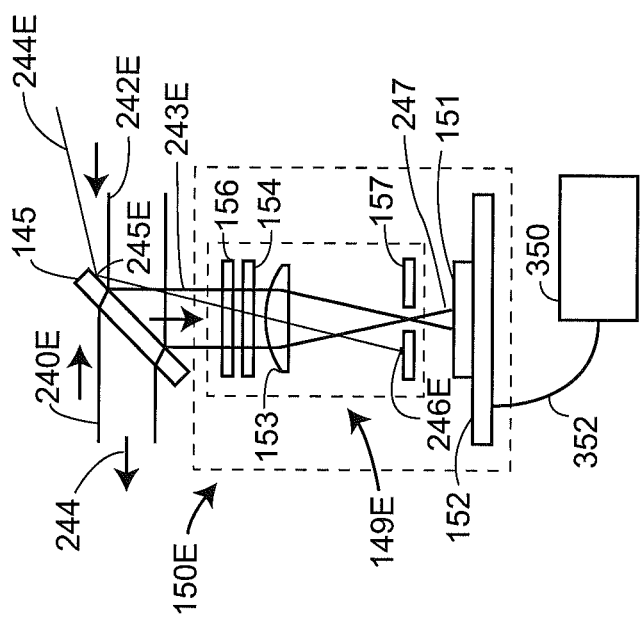

FIG. 6E shows a novel position detector assembly that includes an optical conditioner 149E. Optical conditioner contains a lens 153 and may also contain optional wavelength filter 154. In addition, it includes at least one of a diffuser 156 and a spatial filter 157. As explained hereinabove, a popular type of retroreflector is the cube-corner retroreflector. One type of cube corner retroreflector is made of three mirrors, each joined at right angles to the other two mirrors. Lines of intersection at which these three mirrors are joined may have a finite thickness in which light is not perfectly reflected back to the tracker. The lines of finite thickness are diffracted as they propagate so that upon reaching the position detector they may not appear exactly the same as at the position detector. However, the diffracted light pattern will generally depart from perfect symmetry. As a result, the light that strikes the position detector 151 may have, for example, dips or rises in optical power (hot spots) in the vicinity of the diffracted lines. Because the uniformity of the light from the retroreflector may vary from retroreflector to retroreflector and also because the distribution of light on the position detector may vary as the retroreflector is rotated or tilted, it may be advantageous to include a diffuser 156 to improve the smoothness of the light that strikes the position detector 151. It might be argued that, because an ideal position detector should respond to a centroid and an ideal diffuser should spread a spot symmetrically, there should be no effect on the resulting position given by the position detector. However, in practice the diffuser is observed to improve performance of the position detector assembly, probably because the effects of nonlinearities (imperfections) in the position detector 151 and the lens 153. Cube corner retroreflectors made of glass may also produce non-uniform spots of light at the position detector 151. Variations in a spot of light at a position detector may be particularly prominent from light reflected from cube corners in six-DOF targets, as may be understood more clearly from commonly assigned U.S. patent application Ser. No. 13/370,339 filed Feb. 10, 2012, and Ser. No. 13/407,983, filed Feb. 29, 2012, the contents of which are incorporated by reference. In an embodiment, the diffuser 156 is a holographic diffuser. A holographic diffuser provides controlled, homogeneous light over a specified diffusing angle. In other embodiments, other types of diffusers such as ground glass or "opal" diffusers are used.

The purpose of the spatial filter 157 of the position detector assembly 150E is to block ghost beams that may be the result, for example, of unwanted reflections off optical surfaces, from striking the position detector 151. A spatial filter includes a plate 157 that has an aperture. By placing the spatial filter 157 a distance away from the lens equal approximately to the focal length of the lens, the returning light 243E passes through the spatial filter when it is near its narrowest—at the waist of the beam. Beams that are traveling at a different angle, for example, as a result of reflection of an optical element strike the spatial filter away from the aperture and are blocked from reaching the position detector 151. An example is shown in FIG. 6E, where an unwanted ghost beam 244E reflects off a surface of the beam splitter 145 and travels to spatial filter 157, where it is blocked. Without the spatial filter, the ghost beam 244E would have intercepted the position detector 151, thereby causing the position of the beam 243E on the position detector 151 to be incorrectly determined. Even a weak ghost beam may significantly change the position of the centroid on the position detector 151 if the ghost beam is located a relatively large distance from the main spot of light.

A retroreflector of the sort discussed here, a cube corner or a cateye retroreflector, for example, has the property of reflecting a ray of light that enters the retroreflector in a direction parallel to the incident ray. In addition, the incident and reflected rays are symmetrically placed about the point of symmetry of the retroreflector. For example, in an open-air cube corner retroreflector, the point of symmetry of the retroreflector is the vertex of the cube corner. In a glass cube corner retroreflector, the point of symmetry is also the vertex, but one must consider the bending of the light at the glass-air interface in this case. In a cateye retroreflector having an index of refraction of 2.0, the point of symmetry is the center of the sphere. In a cateye retroreflector made of two glass hemispheres symmetrically seated on a common plane, the point of symmetry is a point lying on the plane and at the spherical center of each hemisphere. The main point is that, for the type of retroreflectors ordinarily used with laser trackers, the light returned by a retroreflector to the tracker is shifted to the other side of the vertex relative to the incident laser beam.

This behavior of a retroreflector 90 in FIG. 3 is the basis for the tracking of the retroreflector by the laser tracker. The position sensor has on its surface an ideal retrace point. The ideal retrace point is the point at which a laser beam sent to the point of symmetry of a retroreflector (e.g., the vertex of the cube corner retroreflector in an SMR) will return. Usually the retrace point is near the center of the position sensor. If the laser beam is sent to one side of the retroreflector, it reflects back on the other side and appears off the retrace point on the position sensor. By noting the position of the returning beam of light on the position sensor, the control system of the laser tracker 10 can cause the motors to move the light beam toward the point of symmetry of the retroreflector.

If the retroreflector is moved transverse to the tracker at a constant velocity, the light beam at the retroreflector will strike the retroreflector (after transients have settled) a fixed offset distance from the point of symmetry of the retroreflector. The laser tracker makes a correction to account for this offset distance at the retroreflector based on scale factor obtained from controlled measurements and based on the distance from the light beam on the position sensor to the ideal retrace point.

As explained hereinabove, the position detector performs two important functions—enabling tracking and correcting measurements to account for the movement of the retroreflector. The position sensor within the position detector may be any type of device capable of measuring a position. For example, the position sensor might be a position sensitive detector or a photosensitive array. The position sensitive detector might be lateral effect detector or a quadrant detector, for example. The photosensitive array might be a CMOS or CCD array, for example.

In an embodiment, the return light that does not reflect off beam splitter 145 passes through beam expander 140, thereby becoming smaller. In another embodiment, the positions of the position detector and the distance meter are reversed so that the light reflected by the beam splitter 145 travels to the distance meter and the light transmitted by the beam splitter travels to the position detector.

The light continues through optional IFM, through the isolator and into the visible light source 110. At this stage, the optical power should be small enough so that it does not destabilize the visible light source 110.

In an embodiment, the light from visible light source 110 is launched through a beam launch 170 of FIG. 5. The fiber launch may be attached to the output of light source 110 or a fiber optic output of the isolator 115.

Figure 8B:
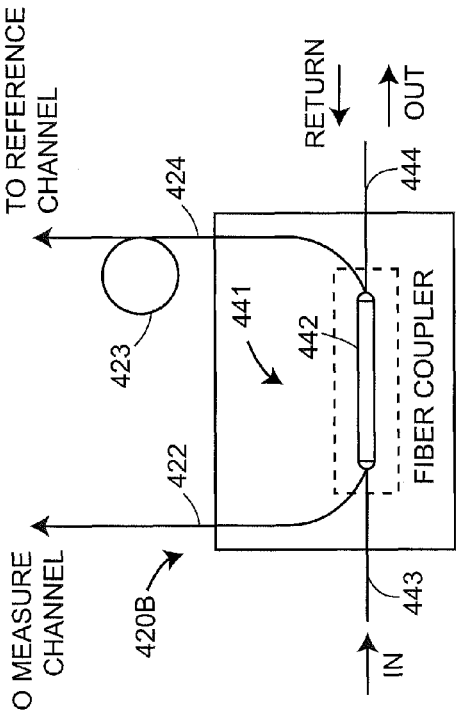

In an embodiment, the fiber network 166 of FIG. 3 is prior art fiber network 420B of FIG. 8B. Here the optical fibers 184, 186, 168, 169 of FIG. 3 correspond to optical fibers 443, 444, 424, 422 of FIG. 8B. The fiber network of FIG. 8B is like the fiber network of FIG. 8A except that the fiber network of FIG. 8B has a single fiber coupler instead of two fiber couplers. The advantage of FIG. 8B over FIG. 8A is simplicity; however, FIG. 8B is more likely to have unwanted optical back reflections entering the optical fibers 422 and 424.

Figure 8C:
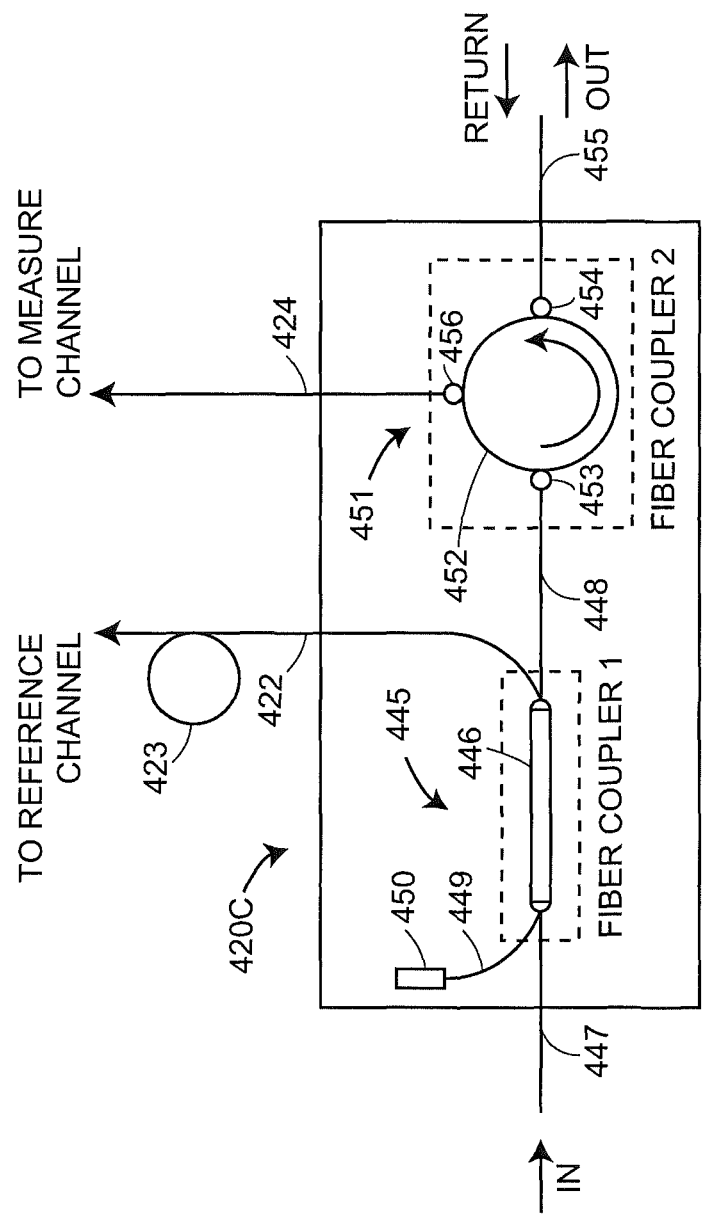
FIG. 8C is a schematic figure showing fiber-optic elements within a fiber-optic network in accordance with an embodiment of the present invention.

In an embodiment, the fiber network 166 of FIG. 3 is fiber network 420C of FIG. 8C. Here the optical fibers 184, 186, 168, 169 of FIG. 3 correspond to optical fibers 447, 455, 423, 424 of FIG. 8C. The fiber network 420C includes a first fiber coupler 445 and a second fiber coupler 451. The first fiber coupler 445 is a 2×2 coupler having two input ports and two output ports. Couplers of this type are usually made by placing two fiber cores in close proximity and then drawing the fibers while heated. In this way, evanescent coupling between the fibers can split off a desired fraction of the light to the adjacent fiber. The second fiber coupler 451 is of the type called a circulator. It has three ports, each having the capability of transmitting or receiving light, but only in the designated direction. For example, the light on optical fiber 448 enters port 453 and is transported toward port 454 as indicated by the arrow. At port 454, light may be transmitted to optical fiber 455. Similarly, light traveling on port 455 may enter port 454 and travel in the direction of the arrow to port 456, where some light may be transmitted to the optical fiber 424. If only three ports are needed, then the circulator 451 may suffer less losses of optical power than the 2×2 coupler. On the other hand, a circulator 451 may be more expensive than a 2×2 coupler, and it may experience polarization mode dispersion, which can be problematic in some situations.

Figure 7B:
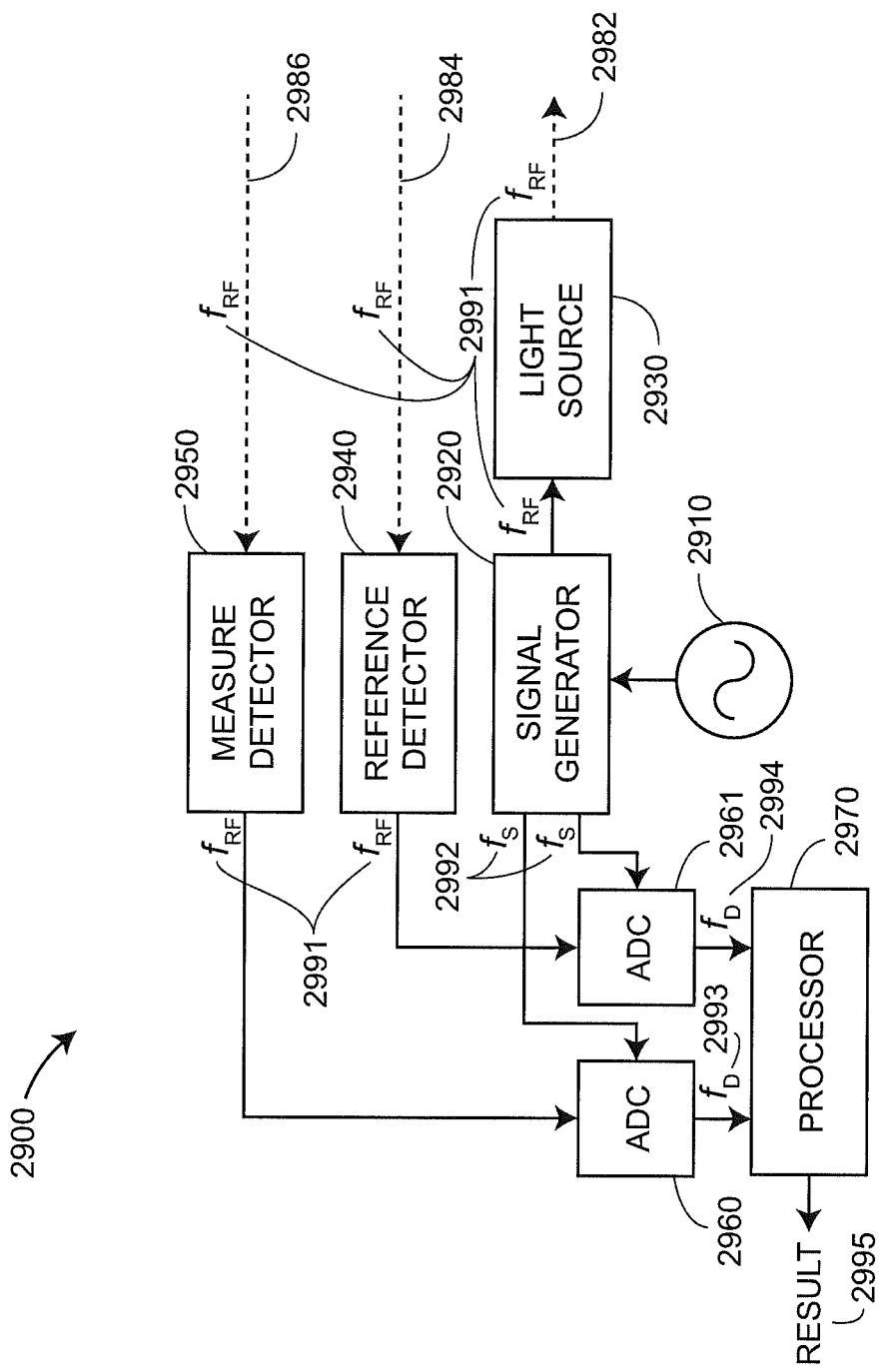
FIG. 7B is a block diagram of electrical and electro-optical elements in an ADM according to an embodiment of the present invention.
Figure 7C:
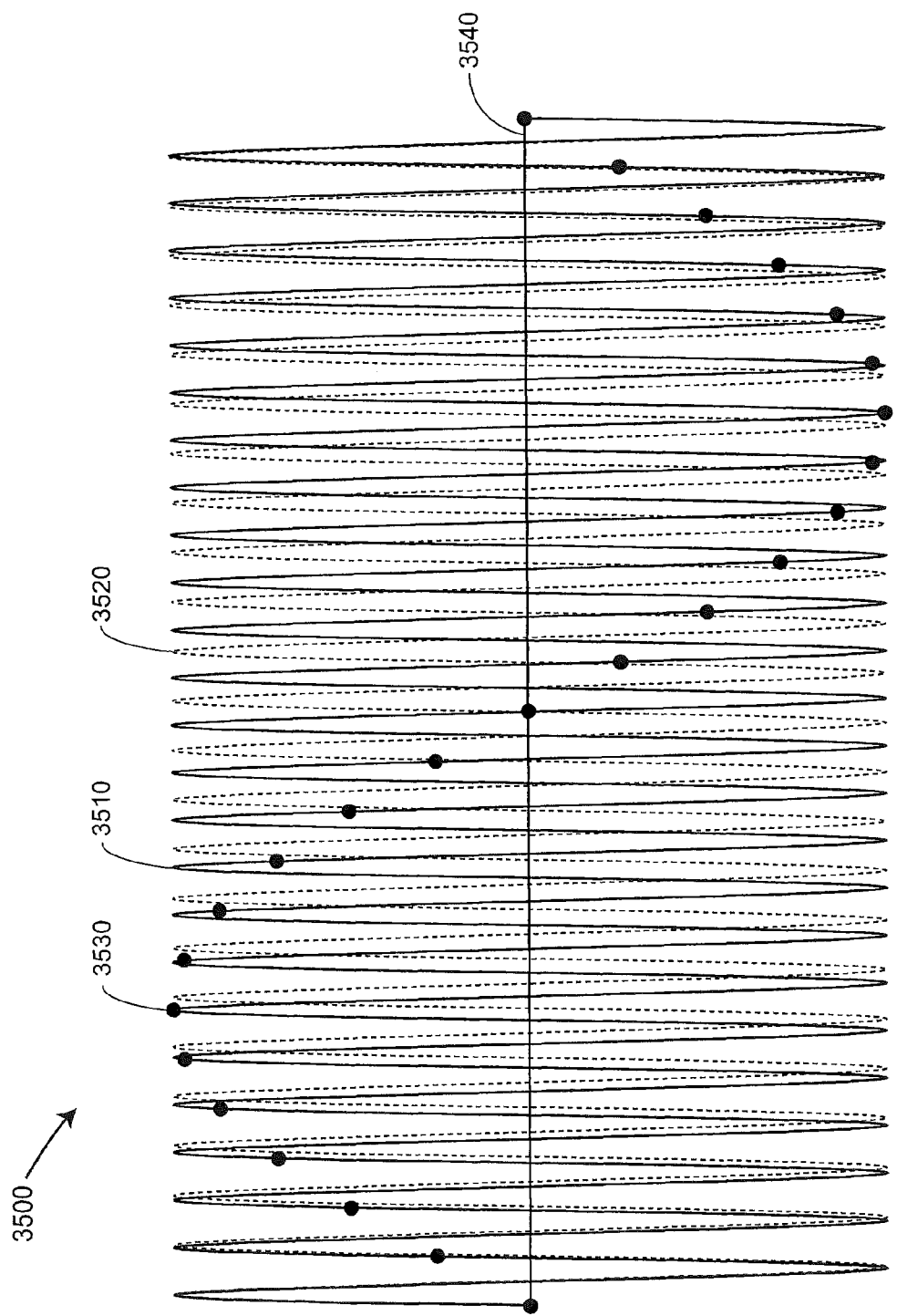
FIG. 7C is an illustration of a first waveform and a second waveform, showing how the first waveform might be used in an analog-to-digital converter to produced an undersampled replica of the second waveform according to an embodiment of the present invention.

In an embodiment, the ADM 160 of FIG. 3 includes the ADM elements 2900 of FIG. 7B. The ADM elements 2900 includes a frequency standard generator 2910, a signal generator 2920, a light source 2930, a reference detector 2940, a measure detector 2950, a first channel of an analog-to-digital converter (ADC) 2960, a second channel of an ADC 2961, a processor 2970, electrical conductors to interconnect elements, and optical fibers 2982, 2984, 2986. The frequency standard generator 2910 sends a standard frequency signal to signal generator 2920. The frequency standard generator 2910 might be, for example, an oven controlled crystal oscillator (OCXO) that emits a 10 MHz sinusoidal signal. The signal generator 2920 generates a radio frequency (RF) signal at frequency $f_{RF}$ and a sampling signal at a frequency $f_S$. The signal generator applies the RF signal to modulate the light source 2930. The light source might be of many types. For example, it might be a distributed feedback (DFB) laser operating at 1550 nm, a laser diode operating at 635 nm (red light), a superluminescent diode operating at 830 nm, or other light source. Alternatively, unmodulated light may be sent to a separate modulator and the signal at frequency $f_{RF}$ may be sent to the separate modulator. In an embodiment, the optical fibers 2982, 2984, and 2986 in FIG. 7B correspond to the optical fibers 186, 168, 169 in FIG. 3. The light source 2930 in FIG. 7B corresponds to the light source 162 in FIG. 3. The reference detector 2940 and the measure detector 2950 convert light into electrical signals having frequency $f_{RF}$. The RF signals from the reference detector and measure detector travel on electrical conductors to signal ports of the first and second channels of the ADC 2960, 2961, respectively. The signal generator 2920 applies sampling signals at sampling frequency $f_S$ to the first and second channels of the ADC at the sample ports. The output signals from the first and second channels of the ADC leave the data ports. As shown in FIG. 7C, the frequency $f_D$ of the undersampled signal is just equal to the absolute value of the difference between $f_{RF}$ and $f_{LO}$. This result is similar to the result obtained by sending two frequencies into a mixer and then through a bandpass filter. For example, when signals are put into RF and LO ports of a mixer at frequencies $f_{RF}$ and $f_{LO}$, respectively, the signals exiting the IF port of the mixer will have frequencies $f_{RF}+f_{LO}$ and $|f_{RF}-f_{LO}|$. In the usual implementation, after passing through the bandpass filter, only the frequency $f_{IF}=|f_{RF}-f_{LO}|$ will remain. By using an ADC in an undersampling mode, it is therefore possible to do away with the need for mixers and associated electronics following the measure and reference detectors. This greatly simplifies the electronics and may improve performance by reducing phase shifts that occur as a result of variations in the electrical power entering the RF ports of the mixer, those variations resulting from variations in optical power reaching the measure detector. In the ADM electronics 3300 of FIG. 7A, two frequencies $f_{RF}$ and $f_{LO}$ are used to obtain an intermediate frequency, which is then sampled at the sample port of the ADC 3322 with a signal having another frequency $f_{REF}/N$. Hence by using an ADC in the undersampling mode of FIGS. 7B and 7C, only two rather than three frequencies are required.

The down conversion process is illustrated in FIG. 7C. The RF signal at frequency $f_{RF}$ is represented by the solid sinusoidal line 3510. The sampling signal at frequency $f_S$ is represented by the dashed sinusoidal line 3520. Whenever the sampling signal crosses the threshold 3540 while increasing its value, the amplitude of the RF signal is sampled at a point 3530. The frequency of the discrete samples 3530 is the data frequency $f_D$, which is just $f_D=|f_{RF}-f_S|$. The data signals from the reference and measure channels are sent to a processor. The method for calculating the distance to the target based on these signals was explained hereinabove with reference to prior art FIG. 7A. An advantage of the ADM elements 2900 of FIG. 7B over the ADM 3300 of FIG. 7A is that the mixers have been eliminated, thereby simplifying the design and making the ADM unit more compact and less expensive. Although the illustration of FIG. 7C shows samples being taken when the sampling signal crosses the threshold 3540, other criteria for taking samples in the ADC could have been used.

One type of signal generator 2920 in FIG. 7B includes two direct digital synthesizers (DDSs). A direct digital synthesizer is a programmable device that can generate a signal at a desired frequency and, in many cases, in a wide variety of waveform shapes. We have found through experimentation that a particularly advantageous signal generator 2920 for use in FIG. 7B includes a dual-channel DDS in which both channels are integrated into a single integrated circuit. Because of the close proximity of the electrical components in each device and because of the similarities in the corresponding semiconductor elements within the two DDS channels, the noise in each channel is highly correlated and cancels to a high degree. When two signals (at frequencies $f_{RF}$ and $f_S$) produced by such a DDS are put into an ADC, the common mode (correlated) noise cancels leaving relatively low-noise data samples of a sinusoid, the sinusoid having a frequency $f_D$. Hence a simple and low-cost ADM can be constructed that has low noise and, consequently, high accuracy.

Figure 7D:
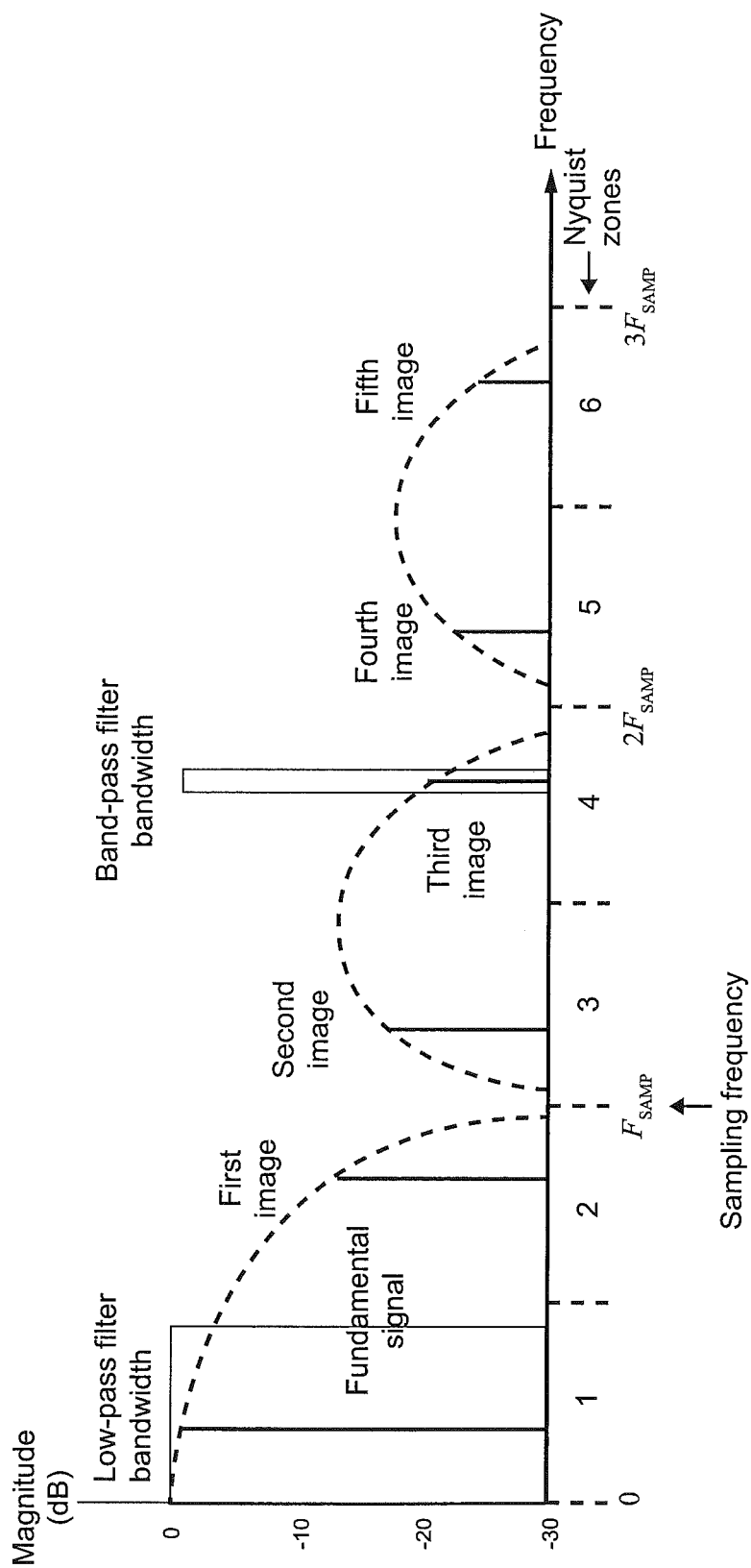
FIG. 7D is a plot illustrating how a direct-digital synthesizer (DDS) can be used in a super-Nyquist mode to increase the DDS frequency.

In some cases, dual-channel DDS devices may not be available having a frequency that is as high as desired. A way around this problem is to use an image signal produced by the DDS. Typically a DDS has a sampling frequency $f_{SAMP}$ derived from a reference signal applied to the DDS. For example, the frequency standard generator 2910 may be a signal applied to an input port of a dual-channel DDS. In some cases, a DDS may have a certain minimum frequency (e.g., 25 MHz) that may be applied. A DDS may multiply the input reference signal up to a desired sampling frequency according to a programmable multiplier value entered by the user. The DDS sampling frequency $F_{SAMP}$ determines the frequency range over which the DDS may generate a signal within a fundamental frequency band. According to the Nyquist criterion, the fundamental frequency band extends from 0 Hz to half the sampling frequency. However, the DDS produces other frequencies in addition those in the fundamental frequency band. By the aliasing principle illustrated in FIG. 7C, image signals may be produced in Nyquist zones 2, 3, 4 . . . as illustrated in FIG. 7D. By applying a bandpass filter after the DDS, the filter having suitable bandpass filter limits, a DDS may be used to generate higher frequencies. Hence, by using a DDS chip in the so-called super-Nyquist mode, higher frequencies can be obtained from a DDS than would otherwise be possible. The use of a DDS in a super-Nyquist mode is discussed in Analog Devices Application Note AN-939, "Super-Nyquist operation of the AD9912 yields a high RF output signal," the contents of which are incorporated by reference. By using a dual-channel DDS chip in a super-Nyquist mode, two closely spaced frequencies at relatively high frequencies and having relatively low noise levels can be obtained. Hence a DDS chip used in a super-Nyquist mode may be a good choice for the signal generator 2920 of FIG. 7B.

When an ADM is used with a retroreflector, such as the SMR 26 of FIG. 1, to measure over a relatively large range, it is usually necessary to begin by measuring the relative phase of light modulated at three or four frequencies, the number of modulation frequencies depending on the required range of measurements and on the accuracy of the system. After the initial measurement is completed, a single modulation frequency may be used with the retroreflector as long as the beam between the measurement device and the retroreflector is not broken. The reason for requiring multiple modulation frequencies initially is that otherwise only a small range would be covered without encountering ambiguity in the measured distance. The multiple frequencies are necessary to distinguish between each of the unambiguity regions corresponding to phases from zero to 360 degrees. The size of an unambiguity region is c/(2fn), where f is the frequency of modulation, c is the speed of light, and n is the index of refraction. For a modulation frequency of 3 GHz, for example, the ambiguity region is approximately 50 millimeters, which is a small fraction of the desired measurement region in most cases. To provide multiple modulation frequencies to remove range ambiguity in an initial measurement, a programmable signal generator 2920 may provide the desired multiple modulation frequencies. Such frequencies may readily be obtained, for example, from programmable DDS chips or from programmable synthesizer chips. By using programmable frequencies, multiple frequencies at desired RF and sampling frequencies may be obtained. One possible combination of frequencies $f_{RF}$ and $f_S$ meet the condition that $f_{RF}$ divided by the absolute value of the difference in $f_{RF}$ and $f_S$ is an integer value. For example, in FIG. 7C, there are 25 cycles of the RF signal for 24 cycles of the sampling signal. Hence if the RF signal has a frequency of 25 MHz, the sampling signal will have a frequency of 24 MHz. The difference in the frequencies is 1 MHz, and the RF frequency divided by the frequency difference is 25. An inspection of FIG. 7C shows that the number of collected points per cycle is 24, which is one less than the RF frequency divided by the frequency difference. Hence the condition described here is the same as saying that the cyclic pattern repeats periodically—in FIG. 7C, the cycle repeats every 25 RF cycles or every 24 sample cycles. It is not necessary that such a condition be obtained to use the ADM method described here. The discussion herein simply illustrates one possibility.

Figure 9:
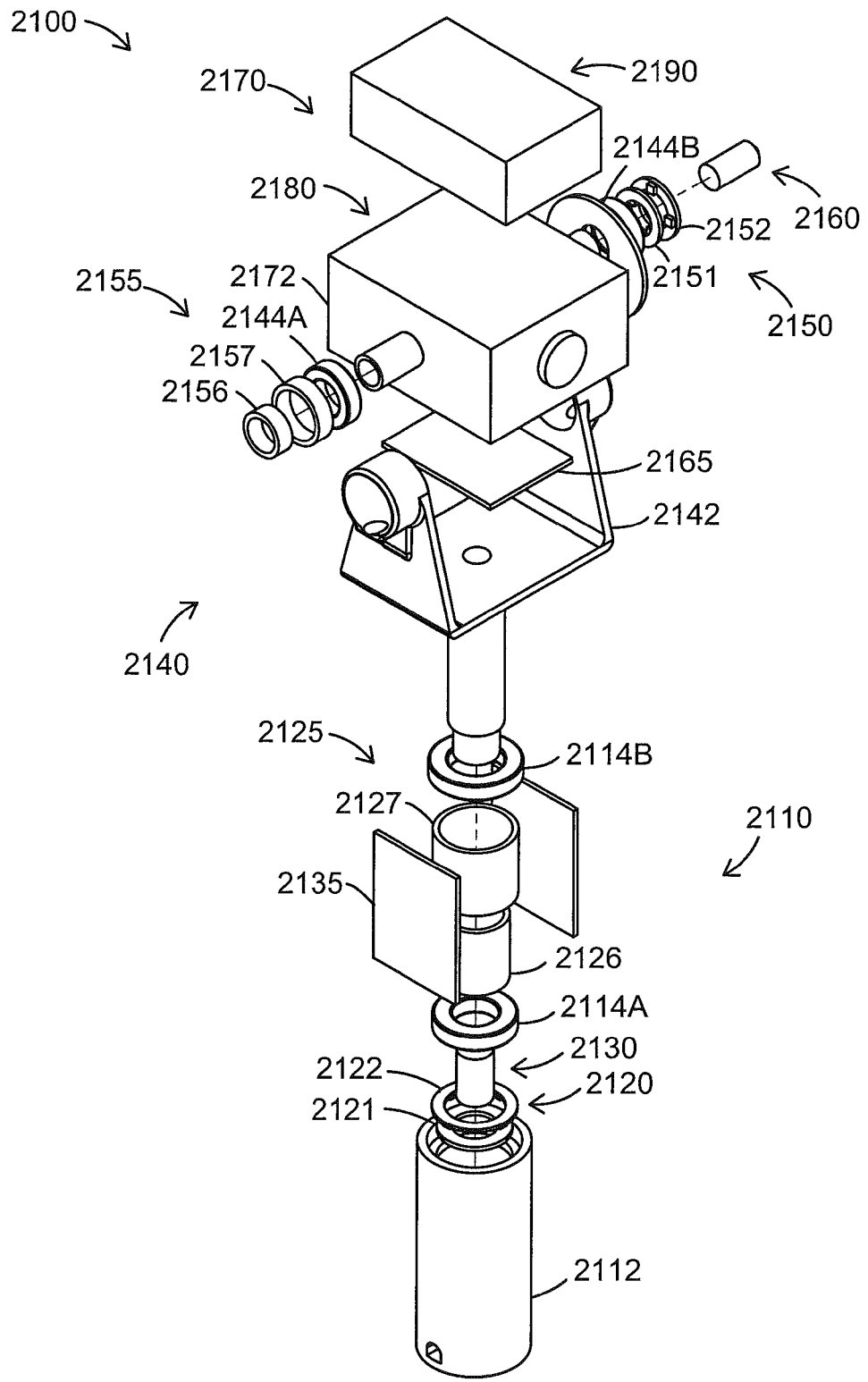
FIG. 9 is an exploded view of a prior art laser tracker.
Figure 10:
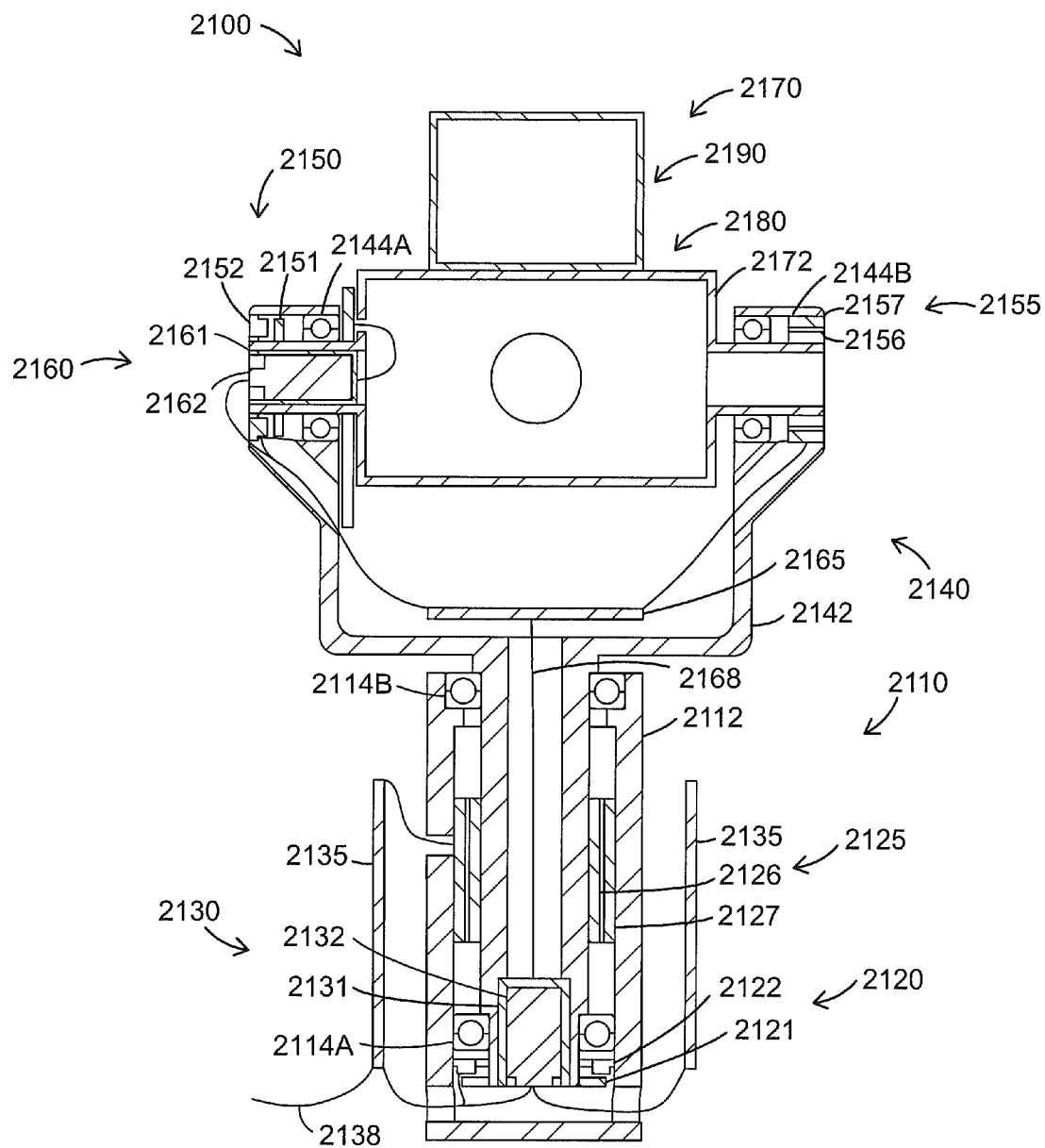
FIG. 10 is a cross-sectional view of a prior art laser tracker.

FIGS. 9 and 10 show exploded and cross sectional views, respectively, of a prior art laser tracker 2100, which is depicted in FIGS. 2 and 3 of U.S. Published Patent Application No. 2010/0128259 to Bridges et al., incorporated by reference. Azimuth assembly 2110 includes post housing 2112, azimuth encoder assembly 2120, lower and upper azimuth bearings 2114A, 2114B, azimuth motor assembly 2125, azimuth slip ring assembly 2130, and azimuth circuit boards 2135.

The purpose of azimuth encoder assembly 2120 is to accurately measure the angle of rotation of yoke 2142 with respect to the post housing 2112. Azimuth encoder assembly 2120 includes encoder disk 2121 and read-head assembly 2122. Encoder disk 2121 is attached to the shaft of yoke housing 2142, and read head assembly 2122 is attached to post assembly 2110. Read head assembly 2122 comprises a circuit board onto which one or more read heads are fastened. Laser light sent from read heads reflect off fine grating lines on encoder disk 2121. Reflected light picked up by detectors on encoder read head(s) is processed to find the angle of the rotating encoder disk in relation to the fixed read heads.

Azimuth motor assembly 2125 includes azimuth motor rotor 2126 and azimuth motor stator 2127. Azimuth motor rotor comprises permanent magnets attached directly to the shaft of yoke housing 2142. Azimuth motor stator 2127 comprises field windings that generate a prescribed magnetic field. This magnetic field interacts with the magnets of azimuth motor rotor 2126 to produce the desired rotary motion. Azimuth motor stator 2127 is attached to post frame 2112.

Azimuth circuit boards 2135 represent one or more circuit boards that provide electrical functions required by azimuth components such as the encoder and motor. Azimuth slip ring assembly 2130 includes outer part 2131 and inner part 2132. In an embodiment, wire bundle 2138 emerges from auxiliary unit processor 50. Wire bundle 2138 may carry power to the tracker or signals to and from the tracker. Some of the wires of wire bundle 2138 may be directed to connectors on circuit boards. In the example shown in FIG. 30, wires are routed to azimuth circuit board 2135, encoder read head assembly 2122, and azimuth motor assembly 2125. Other wires are routed to inner part 2132 of slip ring assembly 2130. Inner part 2132 is attached to post assembly 2110 and consequently remains stationary. Outer part 2131 is attached to yoke assembly 2140 and consequently rotates with respect to inner part 2132. Slip ring assembly 2130 is designed to permit low impedance electrical contact as outer part 2131 rotates with respect to the inner part 2132.

Zenith assembly 2140 comprises yoke housing 2142, zenith encoder assembly 2150, left and right zenith bearings 2144A, 2144B, zenith motor assembly 2155, zenith slip ring assembly 2160, and zenith circuit board 2165.

The purpose of zenith encoder assembly 2150 is to accurately measure the angle of rotation of payload frame 2172 with respect to yoke housing 2142. Zenith encoder assembly 2150 comprises zenith encoder disk 2151 and zenith read-head assembly 2152. Encoder disk 2151 is attached to payload housing 2142, and read head assembly 2152 is attached to yoke housing 2142. Zenith read head assembly 2152 comprises a circuit board onto which one or more read heads are fastened. Laser light sent from read heads reflect off fine grating lines on encoder disk 2151. Reflected light picked up by detectors on encoder read head(s) is processed to find the angle of the rotating encoder disk in relation to the fixed read heads.

Zenith motor assembly 2155 comprises azimuth motor rotor 2156 and azimuth motor stator 2157. Zenith motor rotor 2156 comprises permanent magnets attached directly to the shaft of payload frame 2172. Zenith motor stator 2157 comprises field windings that generate a prescribed magnetic field. This magnetic field interacts with the rotor magnets to produce the desired rotary motion. Zenith motor stator 2157 is attached to yoke frame 2142.

Zenith circuit board 2165 represents one or more circuit boards that provide electrical functions required by zenith components such as the encoder and motor. Zenith slip ring assembly 2160 comprises outer part 2161 and inner part 2162. Wire bundle 2168 emerges from azimuth outer slip ring 2131 and may carry power or signals. Some of the wires of wire bundle 2168 may be directed to connectors on circuit board. In the example shown in FIG. 10, wires are routed to zenith circuit board 2165, zenith motor assembly 2150, and encoder read head assembly 2152. Other wires are routed to inner part 2162 of slip ring assembly 2160. Inner part 2162 is attached to yoke frame 2142 and consequently rotates in azimuth angle only, but not in zenith angle. Outer part 2161 is attached to payload frame 2172 and consequently rotates in both zenith and azimuth angles. Slip ring assembly 2160 is designed to permit low impedance electrical contact as outer part 2161 rotates with respect to the inner part 2162. Payload assembly 2170 includes a main optics assembly 2180 and a secondary optics assembly 2190.

Figure 11:
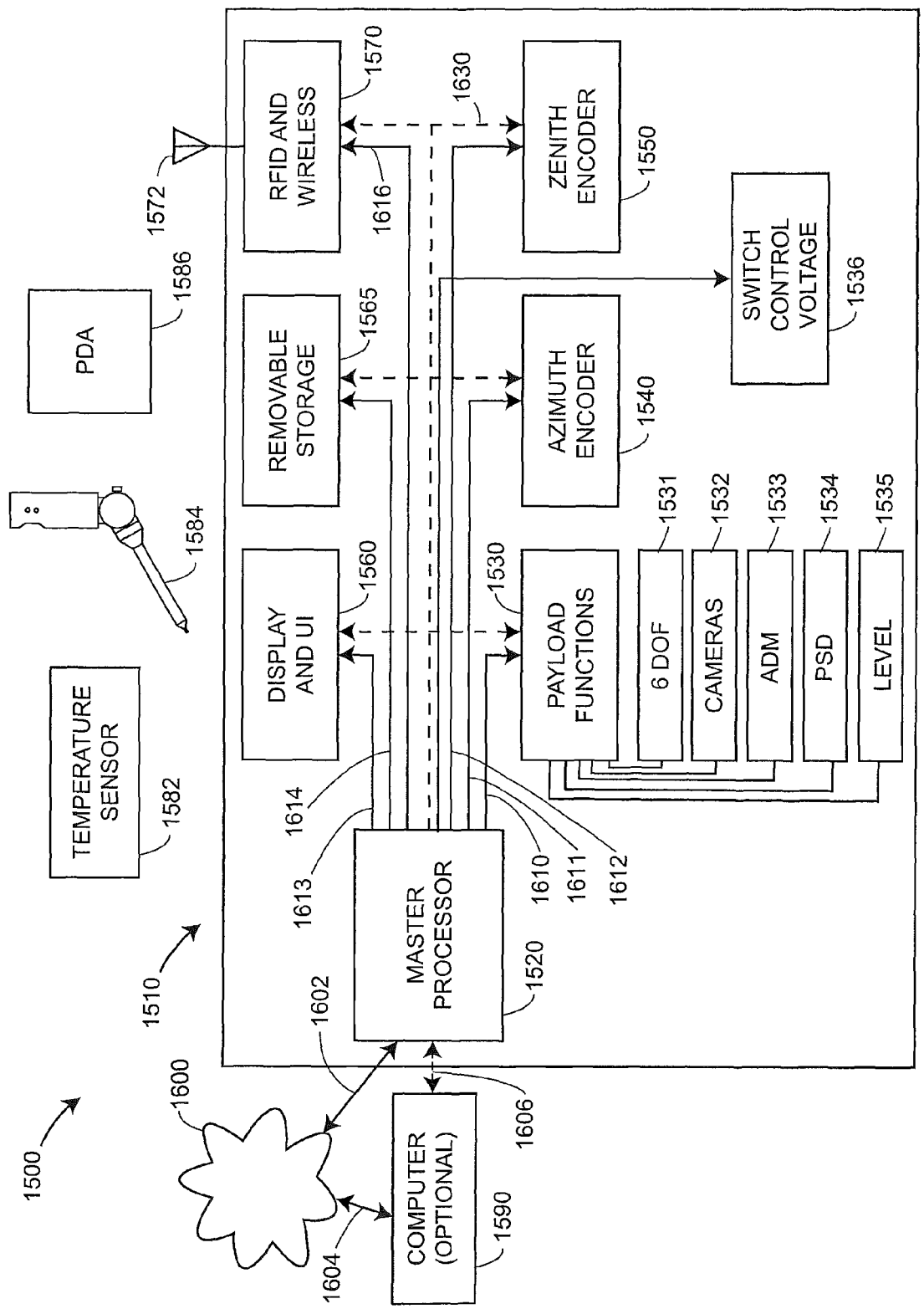
FIG. 11 is a block diagram of the computing and communication elements of a laser tracker in accordance with an embodiment of the present invention.

FIG. 11 is a block diagram depicting a dimensional measurement electronics processing system 1500 that includes a laser tracker electronics processing system 1510, peripheral elements 1582, 1584, 1586, computer 1590, and other networked components 1600, represented here as a cloud. Exemplary laser tracker electronics processing system 1510 includes a master processor 1520, payload functions electronics 1530, azimuth encoder electronics 1540, zenith encoder electronics 1550, display and user interface (UI) electronics 1560, removable storage hardware 1565, radio frequency identification (RFID) electronics, and an antenna 1572. The payload functions electronics 1530 includes a number of subfunctions including the six-DOF electronics 1531, the camera electronics 1532, the ADM electronics 1533, the position detector (PSD) electronics 1534, and the level electronics 1535. Most of the subfunctions have at least one processor unit, which might be a digital signal processor (DSP) or field programmable gate array (FPGA), for example. The electronics units 1530, 1540, and 1550 are separated as shown because of their location within the laser tracker. In an embodiment, the payload functions 1530 are located in the payload 2170 of FIGS. 9, 10, while the azimuth encoder electronics 1540 is located in the azimuth assembly 2110 and the zenith encoder electronics 1550 is located in the zenith assembly 2140.

Many types of peripheral devices are possible, but here three such devices are shown: a temperature sensor 1582, a six-DOF probe 1584, and a personal digital assistant, 1586, which might be a smart phone, for example. The laser tracker may communicate with peripheral devices in a variety of means, including wireless communication over the antenna 1572, by means of a vision system such as a camera, and by means of distance and angular readings of the laser tracker to a cooperative target such as the six-DOF probe 1584.

In an embodiment, a separate communications bus goes from the master processor 1520 to each of the electronics units 1530, 1540, 1550, 1560, 1565, and 1570. Each communications line may have, for example, three serial lines that include the data line, clock line, and frame line. The frame line indicates whether or not the electronics unit should pay attention to the clock line. If it indicates that attention should be given, the electronics unit reads the current value of the data line at each clock signal. The clock signal may correspond, for example, to a rising edge of a clock pulse. In an embodiment, information is transmitted over the data line in the form of a packet. In an embodiment, each packet includes an address, a numeric value, a data message, and a checksum. The address indicates where, within the electronics unit, the data message is to be directed. The location may, for example, correspond to a processor subroutine within the electronics unit. The numeric value indicates the length of the data message. The data message contains data or instructions for the electronics unit to carry out. The checksum is a numeric value that is used to minimize the chance that errors are transmitted over the communications line.

In an embodiment, the master processor 1520 sends packets of information over bus 1610 to payload functions electronics 1530, over bus 1611 to azimuth encoder electronics 1540, over bus 1612 to zenith encoder electronics 1550, over bus 1613 to display and UI electronics 1560, over bus 1614 to removable storage hardware 1565, and over bus 1616 to RFID and wireless electronics 1570.

In an embodiment, master processor 1520 also sends a synch (synchronization) pulse over the synch bus 1630 to each of the electronics units at the same time. The synch pulse provides a way of synchronizing values collected by the measurement functions of the laser tracker. For example, the azimuth encoder electronics 1540 and the zenith electronics 1550 latch their encoder values as soon as the synch pulse is received. Similarly, the payload functions electronics 1530 latch the data collected by the electronics contained within the payload. The six-DOF, ADM, and position detector all latch data when the synch pulse is given. In most cases, the camera and inclinometer collect data at a slower rate than the synch pulse rate but may latch data at multiples of the synch pulse period.

The azimuth encoder electronics 1540 and zenith encoder electronics 1550 are separated from one another and from the payload electronics 1530 by the slip rings 2130, 2160 shown in FIGS. 9, 10. This is why the bus lines 1610, 1611, and 1612 are depicted as separate bus line in FIG. 11.

The laser tracker electronics processing system 1510 may communicate with an external computer 1590, or it may provide computation, display, and UI functions within the laser tracker. The laser tracker communicates with computer 1590 over communications link 1606, which might be, for example, and Ethernet line or a wireless connection. The laser tracker may also communicate with other elements 1600, represented by the cloud, over communications link 1602, which might include one or more electrical cables, such as Ethernet cables, and one or more wireless connections. An example of an element 1600 is another three dimensional test instrument—for example, an articulated arm CMM, which may be relocated by the laser tracker. A communication link 1604 between the computer 1590 and the elements 1600 may be wired (e.g., Ethernet) or wireless. An operator sitting on a remote computer 1590 may make a connection to the Internet, represented by the cloud 1600, over an Ethernet or wireless line, which in turn connects to the master processor 1520 over an Ethernet or wireless line. In this way, a user may control the action of a remote laser tracker.

Although the description given hereinabove has mostly emphasized the use of an absolute distance meter in a laser tracker, it is clear that the distance could be used stand-alone to measure distance only, or it could be used in a different type of dimensional measuring instrument.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A dimensional measurement system including a dimensional measurement device and a target, comprising:
    a signal generator configured to produce in a first mode a first electrical signal having a first frequency and a second electrical signal having a second frequency, wherein the second frequency divided by the first frequency is less than two and the first frequency is different than the second frequency;
    a first light source producing a first light;
    an optical system configured to send a first portion of the first light out of the measurement device as a first beam of light and to send a second portion of the first light to a reference optical detector, the first beam and the second portion having a first optical characteristic modulated at the first frequency;
    the target configured as a retroreflector to receive the first beam and to return a second beam of light to the optical system;
    the optical system further configured to send a third portion of the second beam of light to a measure optical detector, the measure optical detector configured to convert the third portion into a first measure electrical signal, the reference optical detector configured to convert the second portion into a first reference electrical signal;
    a first analog-to-digital converter channel configured in the first mode to receive the second electrical signal, to receive the first measure electrical signal at the first frequency, and to provide a plurality of first digital measure values representative of the first measure electrical signal at a rate equal to the second frequency;
    a second analog-to-digital converter channel configured in the first mode to receive the second electrical signal, to receive the first reference electrical signal at the first frequency, and to provide a plurality of first digital reference values representative of the first reference electrical signal at the rate equal to the second frequency; and
    a processor configured in the first mode to calculate a first distance from the dimensional measurement device to the target, the calculated first distance based at least in part on the first frequency, the second frequency, the plurality of first digital measure values, the plurality of first digital reference values, and the speed of light in air.

2. The dimensional measurement system of claim 1, wherein:
    the signal generator is further configured to produce in a second mode a fourth electrical signal having a fourth frequency and a fifth electrical signal having a fifth frequency, wherein the fifth frequency divided by the fourth frequency is less than two and the fourth frequency is different than the fifth frequency;
    the optical system further configured to send a fourth portion of the first light out of the measurement device as a third beam of light and to send a fifth portion of the first light to the reference optical detector, the third beam and the fifth portion having the first optical characteristic modulated at the fourth frequency;
    the retroreflector configured to receive the third beam and to return a fourth beam of light to the optical system;
    the optical system further configured to send a sixth portion of the fourth beam of light to the measure optical detector, the measure optical detector configured to convert the sixth portion into a second measure electrical signal, the reference optical detector configured to convert the fifth portion into a second reference electrical signal;
    the first analog-to-digital converter channel configured in the second mode to receive the fifth electrical signal, to receive the second measure electrical signal at the fourth frequency, and to provide a plurality of second digital measure values representative of the second measure electrical signal at a rate equal to the fifth frequency;
    the second analog-to-digital converter channel configured in the second mode to receive the fifth electrical signal, to receive the second reference electrical signal at the fourth frequency, and to provide a plurality of second digital reference values representative of the second reference electrical signal at the rate equal to the fifth frequency; and
    the processor further configured in a second mode to calculate the first distance based at least in part on the plurality of second digital measure values and the plurality of second digital reference values.

3. The dimensional measurement system of claim 2, wherein the signal generator is a dual-channel direct digital synthesizer.

4. The dimensional measurement system of claim 3, wherein the first frequency is selected by the processor.

5. The dimensional measurement system of claim 3, wherein both channels of the dual-channel direct digital synthesizer are included in a single electrical component.

6. The dimensional measurement system of claim 3, wherein the dual-channel direct digital synthesizer is operated in the super-Nyquist mode.

7. The dimensional measurement system of claim 2, wherein the first frequency minus the second frequency is equal to the fourth frequency minus the fifth frequency.

8. The dimensional measurement system of claim 2, wherein the first frequency divided by a first difference is an integer and the fourth frequency divided by a second difference is an integer, the first difference equal to the first frequency minus the second frequency and the second difference equal to the fourth frequency minus the fifth frequency.

9. The dimensional measurement system of claim 1, wherein the first light source is directly modulated at the first frequency.

10. The dimensional measurement system of claim 1, wherein the first light source is a laser.

11. The dimensional measurement system of claim 1, wherein the first optical characteristic is optical power.

12. The dimensional measurement system of claim 1, wherein the first beam of light is launched from a first optical fiber.

13. The dimensional measurement system of claim 1, wherein the target is a spherically mounted retroreflector.

14. The dimensional measurement system of claim 1, wherein the measure optical detector and the reference optical detector are pin photodiodes of the same type.

15. The dimensional measurement system of claim 14, wherein the measure optical detector and the reference optical detector are coupled to optical fibers.

16. The dimensional measurement device of claim 1, further comprising:
 a first motor and a second motor that together are configured to direct the first beam of light to a first direction, the first direction determined by a first angle of rotation about a first axis and a second angle of rotation about a second axis, the first angle of rotation produced by the first motor and the second angle of rotation produced by the second motor; and
 a first angle measuring device configured to measure the first angle of rotation and a second angle measuring device configured to measure the second angle of rotation, wherein the processor is further configured to provide three-dimensional coordinates of the target, the three-dimensional coordinates based at least in part on the first distance, the first angle of rotation, and the second angle of rotation.

17. The dimensional measurement device of claim 16, further comprising:
 a position detector assembly that includes a position detector, the position detector assembly configured to receive a seventh portion of the second beam and to produce a position-detector electrical signal in response to a position of the seventh portion on the position detector; and
 a control system that sends a first-motor signal to the first motor and a second-motor signal to the second motor, the first-motor signal and the second-motor signal based at least in part on the position-detector electrical signal, the control system configured to adjust the first direction of the first beam to a position in space of the target.

* * * * *